(12) United States Patent
Seo et al.

(10) Patent No.: US 8,966,546 B2
(45) Date of Patent: Feb. 24, 2015

(54) METHOD AND APPARATUS FOR REPRODUCING CONTENT THROUGH INTEGRATED CHANNEL MANAGEMENT

(75) Inventors: Ju-hee Seo, Hwaseong-si (KR); Sun-hee Youm, Seoul (KR); Seung-ji Yang, Seongnam-si (KR); Hwa-jung Kim, Suwon-si (KR); Woo-sung Shim, Suwon-si (KR); Kyung-sun Cho, Seoul (KR); Ik-hwan Cho, Seoul (KR); Young-ho Moon, Suwon-si (KR); Mi-hwa Park, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 967 days.

(21) Appl. No.: 12/616,164

(22) Filed: Nov. 11, 2009

(65) Prior Publication Data

US 2010/0175089 A1 Jul. 8, 2010

(30) Foreign Application Priority Data

Jan. 7, 2009 (KR) ......................... 10-2009-0001289

(51) Int. Cl.
*H04N 7/18* (2006.01)
*H04N 5/445* (2011.01)
*H04N 7/173* (2011.01)
*H04N 21/45* (2011.01)
(Continued)

(52) U.S. Cl.
CPC ....... *H04N 5/44543* (2013.01); *H04N 7/17318* (2013.01); *H04N 21/4532* (2013.01); *H04N 21/4622* (2013.01); *H04N 21/4788* (2013.01); *H04N 21/478* (2013.01); *H04N 21/4821* (2013.01)

USPC .......................................................... 725/80

(58) Field of Classification Search
CPC .............. H04N 21/472; H04N 21/482; H04N 21/42204
USPC ................................................ 725/32–61, 80
See application file for complete search history.

(56) References Cited

U.S. PATENT DOCUMENTS 6,725,215 B2 4/2004 Yamamoto
7,328,449 B1 2/2008 Park et al.
(Continued)

FOREIGN PATENT DOCUMENTS

CN 1323007 A 11/2001
CN 1339757 A 3/2002
(Continued)

OTHER PUBLICATIONS

Communication, dated Nov. 30, 2012, issued by the State Intellectual Property Office of P.R. China in counterpart Chinese Application No. 200980157381.1.
(Continued)

*Primary Examiner* — Benjamin R Bruckart
*Assistant Examiner* — Aklil Tesfaye
(74) *Attorney, Agent, or Firm* — Sughrue Mion, PLLC

(57) ABSTRACT

Provided are a method and apparatus for reproducing at least one piece of content received via at least one interface. The method includes classifying the at least one piece of content respectively received via the at least one interface according to a reference attribute, allocating the classified at least one piece of content to a virtual channel, and selecting a channel from among set channels that include the virtual channel and an occupied basic channel.

57 Claims, 19 Drawing Sheets

(51) Int. Cl.
*H04N 21/462* (2011.01)
*H04N 21/4788* (2011.01)
*H04N 21/482* (2011.01)
*H04N 21/478* (2011.01)

(56) References Cited

U.S. PATENT DOCUMENTS

| | | | |
|---|---|---|---|
| 7,506,066 B2 | 3/2009 | Nobakht et al. | |
| 2002/0124071 A1* | 9/2002 | Proehl et al. | 709/223 |
| 2002/0168178 A1* | 11/2002 | Rodriguez et al. | 386/92 |
| 2004/0060063 A1* | 3/2004 | Russ et al. | 725/46 |
| 2004/0117821 A1* | 6/2004 | Karaoguz et al. | 725/37 |
| 2004/0205816 A1* | 10/2004 | Barrett | 725/49 |
| 2005/0120034 A1* | 6/2005 | Sezan et al. | 707/100 |
| 2005/0210145 A1* | 9/2005 | Kim et al. | 709/231 |
| 2007/0006266 A1* | 1/2007 | Yamamoto | 725/46 |
| 2007/0074245 A1* | 3/2007 | Nyako et al. | 725/34 |
| 2007/0106522 A1 | 5/2007 | Collins | |
| 2007/0107019 A1* | 5/2007 | Romano et al. | 725/80 |
| 2007/0124769 A1* | 5/2007 | Casey et al. | 725/46 |
| 2007/0174568 A1 | 7/2007 | Kii | |
| 2007/0186270 A1* | 8/2007 | Kang et al. | 725/135 |
| 2008/0284917 A1* | 11/2008 | Inui | 348/721 |
| 2009/0150783 A1 | 6/2009 | Seo et al. | |

FOREIGN PATENT DOCUMENTS

| | | |
|---|---|---|
| CN | 1855284 A | 11/2006 |
| CN | 1893642 A | 1/2007 |
| CN | 101151885 A | 3/2008 |
| JP | 2006-86820 A | 3/2006 |
| KR | 2001-0104677 A | 11/2001 |
| KR | 100323685 B1 | 2/2002 |
| KR | 20030019307 A | 3/2003 |
| KR | 1020060097887 A | 9/2006 |
| KR | 10-2006-0109839 A | 10/2006 |
| KR | 100649296 B1 | 11/2006 |
| KR | 100720556 B1 | 5/2007 |
| KR | 10-2008-0074169 A | 8/2008 |
| KR | 1020090058953 A | 6/2009 |
| WO | 01/39494 A1 | 5/2001 |
| WO | 2008/005657 A2 | 1/2008 |

OTHER PUBLICATIONS

International Search Report and Written Opinion dated Jun. 25, 2010, issued in the corresponding International Application No. PCT/KR2009/006470.

Communication, dated Nov. 14, 2013, issued by the State Intellectual Property Office of the People's Republic of China in counterpart Chinese Application No. 200980157381.1.

Communication, dated Mar. 31, 2014, issued by the State Intellectual Property Office of the People's Republic of China in counterpart Chinese Application No. 200980157381.1.

Communication from the European Patent Office issued Jul. 2, 2013 in counterpart European Application No. 09837644.5.

Communication dated Jul. 18, 2012 issued by the Mexican Patent Office in counterpart Mexican Application No. MX/a/2011/007309.

* cited by examiner

FIG. 16

| ACTUAL TIME (1610) | FIRST CHANNEL SWITCHING (1630) | SECOND CHANNEL SWITCHING (1640) |
|---|---|---|
| | 20:30:37 (1613) | 21:47:26 (1615) |
| MEDIA TIME (1620) | | |
| 00:00:00 | 00:37:29 (1623) | 00:37:30 (1625) |
| MEDIA TIME (1630) | | |
| 00:00:00 | 00:37:29 (1633) | 01:54:19 (1635) |

METHOD AND APPARATUS FOR REPRODUCING CONTENT THROUGH INTEGRATED CHANNEL MANAGEMENT

CROSS-REFERENCE TO RELATED PATENT APPLICATION

This application claims priority from Korean Patent Application No. 10-2009-0001289, filed on Jan. 7, 2009, in the Korean Intellectual Property Office, the disclosure of which is incorporated herein in its entirety by reference.

BACKGROUND OF THE INVENTION

1. Field of the Invention

Apparatuses and methods consistent with the present invention relate to reproducing various provided content provided and managing the reproduction.

2. Description of the Related Art

Content reproduction apparatuses, such as a television (TV), which have recently been developed can receive a signal from a broadcasting base station but also can be connected to peripheral devices having memory. For example, peripheral devices, such as small-scale memory, a hard disc, a camera, an MP3 player, a portable media player, and a camcorder, can be directly connected to a display device, such as a digital TV. A digital TV is capable of reproducing not only general broadcast contents but also content received via a compatible peripheral device.

In general, a digital TV provides a user with an electronic program guide (EPG) configured based on program information received from a broadcasting station. The user can view broadcast content by selecting a desired broadcast channel according to the EPG.

In order to reproduce content input to a digital TV via a peripheral device, the digital TV ends a mode wherein a user interface (UI) for reproduction of broadcast content is used and an EPG, and enters a mode wherein a UI for peripheral devices is used. A user may select and reproduce content received from a peripheral device by manipulating the UI for peripheral devices, separately from the UI for reproduction of broadcast content. The digital TV accesses the memory of the peripheral device and calls the selected content in order to reproduce the selected content.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

Exemplary embodiments of the present invention provide a method and apparatus for managing and reproducing received content by setting a virtual channel thereof.

According to an aspect of the present invention, there is provided a method of reproducing at least one piece of content received via at least one interface, the method including classifying the at least one piece of content respectively received via the at least one interface according to a predetermined attribute; allocating the classified content to a virtual channel; and selecting a channel from among set channels that include the virtual channel and an occupied basic channel.

The method may further include reproducing the at least one content allocated to the selected predetermined channel.

The method may further include storing channel setting information, and storing reproduction state information of the content.

The method may further include reproducing the content based on reproduction state information of the content.

The method may further include transmitting virtual channel metadata via a network, where the virtual channel metadata includes information regarding the classification of the content, the channel setting information, and the reproduction state information.

The method may further include generating a channel selection guide displaying the set channels which include the virtual channel and the occupied basic channel, and reproducing the channel selection guide. The selecting of a channel from among the set channels may include allowing a user to select a channel from among the set channels, based on the channel selection guide.

The virtual channel may be allocated a channel number from among all channel numbers excluding a channel number allocated to the occupied basic channel.

The reference attribute may include at least one of a time when the content has been generated, an application for running the content, a media type of the content, a coding method of the content, a file name of the content, a file extension of the content, an event related to the content, and a theme of the content.

The content may include on-line content accessed via a network interface, and the reference attribute may include a uniform resource identifier (URI) of the on-line content.

The reproduction state information may specify a point of time at which reproduction of the content has been discontinued, a screen configuration used when the content is reproduced, and an application for running the content.

During the transmitting of the virtual channel metadata, the content and the virtual channel metadata may be registered with a hub site in the network or may be transmitted to another party according to the other party's request.

During the transmitting of the virtual channel metadata, the other party may set channels of a content reproducing apparatus of the other party based on the channel setting information included in the virtual channel metadata. If the other party selects a virtual channel based on a list of the set channels, at least one piece of content corresponding to the selected virtual channel may be reproduced based on the reproduction state information included in the virtual channel metadata.

In the method, a first user may remotely control a reproducing apparatus of a second user to set a channel list of the reproducing apparatus of the other party based on channel setting information included in the virtual channel metadata, and may provide at least one piece of content corresponding to the virtual channel.

The at least one interface may include at least one of an interface according to universal serial bus (USB) standards, an interface for receiving a composite audio/video (AV) signal, an interface for a separated-video signal, a serial bus interface according to IEEE 1394 standards, an interface for wired network connection, and an interface for wireless network connection.

The method may further include changing the virtual channel.

According to another aspect of the present invention, there is provided a method of reproducing content shared with another party accessed via a network, the method including receiving virtual channel metadata of a content reproducing apparatus of the other party, where the virtual channel metadata includes channel setting information and reproduction state information of the content; generating at least one virtual channel based on the channel setting information; receiving at least one piece of content corresponding to the virtual channel; and reproducing the at least one piece of content based on the reproduction state information. The virtual channel may be allocated to a content group into which at least one piece of content received via at least one interface of the content reproducing apparatus of the other party is classified according to at least one predetermined attribute, where the content group includes at least one piece of content having the same attribute.

The method may further include generating a channel selection guide by using the generated virtual channel. The receiving of the at least one piece of content may include reproducing the channel selection guide, and when a virtual channel is selected based on the channel selection guide, receiving at least one piece of content corresponding to the selected virtual channel.

The receiving of the at least one piece of content corresponding to the selected virtual channel may include searching the virtual channel metadata for location information of the at least one piece of content corresponding to the selected virtual channel; and receiving the at least one piece of content based on the location information.

The method may further include accessing the virtual channel metadata of the other party and the at least one piece of content corresponding to the virtual channel, which are registered with a hub site in the network.

The generating of the at least one virtual channel may include generating the at least one virtual channel based on the channel setting information, under remote control of the other party. The receiving of the at least one piece of content may include receiving at least one piece of content corresponding to a virtual channel selected by the other party. The reproducing of the at least one piece of content may include reproducing the content according to a reproduction state determined by the other party, based on the reproduction state information.

The method may further include transmitting a message regarding the content to the other party via the network.

According to another aspect of the present invention, there is provided an apparatus for reproducing at least one piece of content received via at least one interface, the apparatus including a content classification unit classifying at least one piece of content being respectively received via at least one interface according to a predetermined attribute; a virtual channel allocation unit allocating the classified content to a virtual channel; and a channel selection unit selecting a channel from among set channels that include the virtual channel and an occupied basic channel.

The reproducing apparatus may reproduce at least one piece of content allocated to the selected channel.

The reproducing apparatus may store channel setting information and reproduction state information of the content.

The reproducing apparatus may further include a network sharing unit transmitting virtual channel metadata via a network, where the virtual channel metadata includes information regarding the classification of the content, the channel setting information, and the reproduction state information.

The apparatus may further include a channel selection guide reproduction unit generating a channel selection guide displaying the set channels which include the virtual channel and occupied basic channel, and reproducing the channel selection guide. The channel selection unit may allow a user to select a channel from among the set channels, based on the channel selection guide.

According to another aspect of the present invention, there is provided an apparatus for reproducing content shared with another party accessed via a network, the apparatus including a virtual channel metadata receiving unit receiving virtual channel metadata of a content reproducing apparatus of the other party. The virtual channel metadata may include channel setting information and reproduction state information of the content; a virtual channel generation unit generating at least one virtual channel based on the channel setting information; a content receiving unit receiving at least one piece of content corresponding to the virtual channel; and a content reproduction unit reproducing the at least one piece of content based on the reproduction state information. The virtual channel may be allocated to a content group into which at least one piece of content received via at least one interface of the content reproducing apparatus of the other party is classified according to at least one predetermined attribute. The content group may include at least one piece of content having the same attribute.

The apparatus may further include a channel selection guide generation unit generating a channel selection guide by using the generated virtual channel. When a virtual channel is selected based on the channel selection guide, the content receiving unit may receive at least one piece of content corresponding to the selected virtual channel.

According to another aspect of the present invention, there is provided a method of reproducing at least one piece of content received via at least one interface, the method including respectively allocating at least one virtual channel to the at least one interface; and when the at least one virtual channel is selected, outputting information received via an interface mapped to the selected at least one virtual channel.

When the information received via the mapped interface is streaming information, the outputting of the information may include outputting the streaming information.

When the information received via the mapped interface is at least one piece of file information, the outputting of the information may include outputting the at least one piece of file information.

When the information received via the mapped interface is at least one piece of file information, the method may further include classifying the file information into a file group according to at least one attribute. The respective allocating of the at least one virtual channel to the at least one interface may include allocating one virtual channel to the file group.

The virtual channel allocated to the file group may be a sub channel of the at least one virtual channel allocated to the at least one interface.

The allocating of the at least one virtual channel to the at least one interface may include determining a new file group, which is additionally generated after the at least one virtual channel is allocated to the file group, to be a sub channel of the at least one virtual channel.

According to another aspect of the present invention, there is provided an apparatus for reproducing at least one piece of content received via at least one interface, the apparatus including an interface-based virtual channel allocation unit respectively allocating at least one virtual channel to the at least one interface; and an interface-based information output unit outputting information received via an interface mapped to a selected virtual channel when the virtual channel is selected.

According to another aspect of the present invention, there is provided a computer readable recording medium having recorded thereon a computer program for executing a method of reproducing at least one piece of content received via at least one interface.

According to another aspect of the present invention, there is provided a computer readable recording medium having recorded thereon a computer program for executing a method of reproducing content shared with another party accessed via a network.

According to another aspect of the present invention, there is provided a computer readable transmission medium having transmitted thereon a computer program for executing another method of reproducing at least one piece of content received via at least one interface.

BRIEF DESCRIPTION OF THE DRAWINGS

The above and other aspects of the present invention will become more apparent by describing in detail exemplary embodiments thereof with reference to the attached drawings in which:

FIG. 16 illustrates a method of reproducing content during channel switching according to an exemplary embodiment of the present invention;

DETAILED DESCRIPTION OF THE INVENTION

Figure 1A:
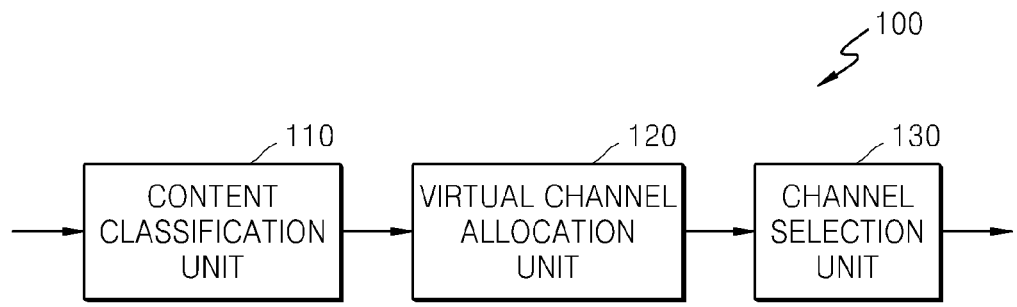
FIG. 1A is a block diagram of a content reproducing apparatus according to an exemplary embodiment of the present invention.

FIG. 1A is a block diagram of a content reproducing apparatus 100 according to an exemplary embodiment of the present invention. The content reproducing apparatus 100 reproduces at least one piece of content input via at least one interface. The content reproducing apparatus 100 includes a content classification unit 110, a virtual channel allocation unit 120 and a channel selection unit 130.

Although not shown, the content reproducing apparatus 100 may include an internal input interface for receiving a broadcast signal and at least one external input interface for receiving an external signal.

Examples of such an external input interface may include an interface according to the universal serial bus (USB) standards (hereinafter referred to as a 'USB interface'), an interface for receiving a composite audio/video (AV) signal (hereinafter referred to as a 'composite AV interface'), an interface for receiving a separated (S)-video signal (hereinafter referred to as an 'S-video interface'), a serial bus interface according to the IEEE 1394 standards (hereinafter referred to as an 'IEEE 1394 interface'), and an interface for wired or wireless network connection (hereinafter referred as 'network interface').

A broadcast signal may be received in the form of a data stream, and similarly, externally input content may also be received in the form of a data stream. Upon receiving an analog signal, e.g., a composite AV signal or an S-video signal, the content reproducing apparatus 100 is capable of processing the analog signal by transforming the analog signal into a digital data stream.

Data may be input from an external memory via the at least one external input interface. However, an interface for the content reproducing apparatus 100 is not limited to the above description, and other interfaces for receiving various signals may be employed. In the present specification, the term 'content' will be used to include multimedia content but may also include a file storing the multimedia content.

The content classification unit 110 classifies the at least one piece of content received via the at least one interface included in the content reproducing apparatus 100 according to a predetermined attribute. The content classification unit 110 may create information regarding the result of classifying content according to the predetermined attribute and output the information to the virtual channel allocation unit 120.

The content classification unit 110 may interpret the attribute of the input at least one piece of content. Also, the content classification unit 110 may determine a reference attribute for content classification, and classify the at least one piece of content by comparing the interpreted attribute with the reference attribute. Examples of the predetermined attribute of content include a time when the content was created or manufactured, an application for executing the content, the media type of the content, a file name extension of the content, a coding method of the content, a file name of the content, and the contents of the content.

The media type of the content indicates whether the content is an image, video or audio. The application for executing the content indicates a method of presenting the content. For example, if the content consists of a plurality of images, the application may include a reproduction method, such as a thumbnail format, a slideshow format, a mosaic format, an album format, and Animated GIF format. If the content is video, the application indicates whether all frames are to be continuously reproduced or the frames are to be individually reproduced. If the content is audio, the application indicates a method of reproducing the audio. The contents of the content may include, for example, the theme, subject matter, and characters of the media included in the content, and may be detected based on information that is included in a file by a user.

The reference attribute may be determined by a user or may be predetermined according to a content reproduction environment.

The content classification unit 110 may interpret the attribute of the at least one piece of content. Thus, according to an exemplary embodiment of the present invention, it is possible to perform content classification by collecting a plurality of pieces of content that correspond to the reference attribute, based on the attribute determined by the content classification unit 110 and independently from a content classification method employed by an external memory device connected to the content reproducing apparatus 100 via an external input interface. Regardless of a file list, a folder list, or a content list provided from the external memory device, the content classification unit 110 according to an exemplary embodiment of the present invention performs content classification by individually determining a content attribute. Accordingly, content classification may be performed in consideration of a content reproduction environment and user demand.

The content reproducing apparatus 100 may include one or more interfaces, and one or more pieces of content may be respectively received from the interfaces. Thus, a plurality of pieces of content may be received from the outside. Also, since there are a plurality of attributes for content classification, a plurality of pieces of content may be classified according to the attributes, and a plurality of pieces of content may belong to one attribute.

In order to form such many-to-many relationships of content and attributes, the content classification unit 110 may classify one or more pieces of content being respectively received via one or more interfaces according to one or more attributes, and group the pieces of content according to each of the attributes.

Since content may be received from various locations, the pieces of content may include not only files stored in a memory unit of a peripheral device but may also include online content that may be accessed via a network interface. A uniform resource identifier (URI) of the online content may be used as an attribute for classifying the online content. If an analog signal is received, the pieces of content may further include content obtained by transforming the analog signal into a digital data stream by using an analog-to-digital converter (ADC).

According to an exemplary embodiment of the present invention, the virtual channel allocation unit 120 may allocate at least one piece of content, which is classified by the content classification unit 110 with respect to each interface, to a virtual channel. The virtual channel may be allocated an unoccupied channel number from among all channel numbers that the content reproducing apparatus 100 can determine, except for occupied basic channel numbers. Here, an occupied basic channel may be a broadcast channel.

According to an exemplary embodiment, content classification and channel setting are performed according to each interface. Thus, if a plurality of pieces of content are respectively received via different interfaces, the pieces of content are classified into different content groups and are allocated to different virtual channels, respectively. Alternatively, all pieces of content received from an external source via a plurality of interfaces may be simultaneously classified regardless of the type of interface.

If the content classification unit 110 forms a content group by classifying content according to each attribute, the virtual channel allocation unit 120 may allocate one virtual channel to the content group. Thus, if a plurality of content groups are formed, a plurality of virtual channels may be determined.

The content classification unit 110 may also classify content according to a hierarchical attribute. Thus, content groups having a hierarchical structure may be generated according to the hierarchical structure of each attribute. The virtual channel allocation unit 120 may hierarchically allocate channel numbers to the content groups having the hierarchical structure. The virtual channel allocation unit 120 may allocate virtual channels, the channel numbers of which are close to one another, to content groups having similar attributes.

The content reproducing apparatus 100 may edit or change virtual channels. The virtual channels may be edited or modified through user manipulation. For example, a hierarchical structure of virtual channel numbers, a reference attribute for content classification, and the names and channel numbers of the virtual channels may be modified. Also, it is possible to perform channel editing by adding or canceling a virtual channel or changing the order of virtual channels. Also, it is possible to perform content editing by adding or canceling content corresponding to a virtual channel, or moving the content.

Also, virtual channels may be allocated or changed based on frequency of use. For example, a virtual channel may be automatically allocated to content that is frequently reproduced, based on the number of times that a user selects content in order to reproduce the content. The order of virtual channels may be changed according to the number of times that each of a plurality of pieces of content respectively corresponding to the virtual channels is reproduced for a given time.

Alternatively, virtual channels may be allocated based on the user's degree of satisfaction with or the user's preference for the content. For example, if the user inputs his or her degree of satisfaction with or his or her preference for a plurality of pieces of content, the content classification unit 110 may check the degree of satisfaction or preference and classify the pieces of content into several content groups, and the virtual channel allocation unit 120 may respectively allocate virtual channels to the pieces of content according to the degree of satisfaction or preference. For example, a content group having a high degree of satisfaction or preference may be allocated a virtual channel that has either a channel number designated by the user or a channel number that is accessible.

According to an exemplary embodiment of the present invention, if the content reproducing apparatus 100 is designed to particularly reproduce content having a predetermined attribute, then the content classification unit 110 may determine the predetermined attribute to be a reference attribute for content classification and the virtual channel allocation unit 120 may fixedly allocate a virtual channel given a predetermined channel number to a content group to which the content having the predetermined attribute belongs. Thus, the content having the predetermined attribute that is input to the content reproducing apparatus 100 designed to particularly reproduce content having the predetermined attribute, may be automatically mapped to the fixed virtual channel number.

According to an exemplary embodiment of the present invention, the channel selection unit 130 selects a channel from among the virtual channel allocated by the virtual channel allocation unit 120 and other channels including the occupied basic channel.

According to an exemplary embodiment of the present invention, the content reproducing apparatus 100 generates a channel selection guide in which the virtual channel and other channels including the occupied basic channel (hereinafter, referred to as 'set channel') are displayed, and reproduces the channel selection guide. The channel selection unit 130 may receive a channel selection signal from a user via the channel selection guide.

According to an exemplary embodiment of the present invention, the channel selection guide is an example of an electronic program guide (EPG), and both a basic channel and a virtual channel are displayed in the channel selection guide. Also, in the channel selection guide, running time information of content is displayed with respect to each channel. The running time information specifies, for example, a total running time, a point of time at which reproduction of the content is discontinued or restarts, and a point of time at which the content is recorded.

According to an exemplary embodiment of the present invention, the content reproducing apparatus 100 may reproduce at least one piece of content corresponding to a virtual channel selected by the channel selection unit 130. The content reproducing apparatus 100 may store reproduction state information of the reproduced content.

If a plurality of pieces of content correspond to the virtual channel selected by the channel selection unit 130, the pieces of content may be seamlessly reproduced or may be displayed in a thumb nail format. A user may determine the order of reproducing a plurality of pieces of content that are mapped to the same virtual channel.

It is possible to reproduce content based on the reproduction state information of the content. For example, the content may be reproduced starting from a point at which the reproduction of the content was discontinued, based on information regarding a point at which the reproduction of the content was discontinued, which may be included in the reproduction state information.

In order to restart reproduction of content corresponding to a predetermined channel a predetermined length of time after the reproduction was discontinued, the reproduction may be resumed when the predetermined length of the time during which the reproduction was discontinued elapses from the point of time that the reproduction was discontinued.

According to an embodiment of the present invention, the content reproducing apparatus 100 may store channel setting information and reproduction state information of content. For example, the reproduction state information may include information regarding a point of time at which the content is reproduced. The reproduction state information may further include information regarding screen configuration for the reproduction of the content, information regarding an application for executing reproduction/display of the content, and so on. The screen configuration indicates, for example, the location and size of a window via which the reproduced content is displayed on a screen, and a state in which the content overlaps with other pieces of content.

For example, the channel setting information may include a reference attribute for content classification, the channel numbers of virtual channels, a hierarchical structure of the virtual channels, and the relationship between attributes and the virtual channels.

Also, content may be reproduced based on stored reproduction state information thereof. Thus, the content may be reproduced based on a point of time at which the content is reproduced, an application for content reproduction, screen configuration of content reproduction, etc.

The channel setting information stored in the content reproducing apparatus 100 may be updated when channel settings are changed. Similarly, the reproduction state information may be updated when the reproduction state of the content is changed.

According to an exemplary embodiment of the present invention, the content reproducing apparatus 100 may further include a network share unit (not shown) that transmits virtual channel metadata containing information regarding content classification and channel setting and reproduction state information of reproduced content, via a network. According to an exemplary embodiment of the present invention, to facilitate network sharing, in the content reproducing apparatus 100, data may be shared by directly delivering the data to another party that is accessible via a network or by performing registration/authentication via a mediator, such as a hub site.

In the case of network sharing using a hub site, the network share unit may register content and virtual channel metadata with one hub site in a network. Then, the other party may use the virtual channel metadata or the content via the hub site.

In the case of network sharing without mediation, the network share unit may transmit virtual channel metadata and transmit at least one piece of content corresponding to the virtual channel metadata, in response to a request from the other party that wants to share a channel.

The content reproducing apparatus 100 may access a content reproducing apparatus of the other party that receives the virtual channel metadata, not necessarily in response to a request from the other party. The content reproducing apparatus 100 that provides the virtual channel metadata may set a virtual channel for the content reproducing apparatus of the other party by controlling the content reproducing apparatus at a remote location, based on channel setting information of the virtual channel metadata.

In order to remotely control a predetermined virtual channel to be selected from among a plurality of virtual channels of the other party and content corresponding to the selected virtual channel to be reproduced, the content reproducing apparatus 100 that provides the virtual channel metadata may directly transmit the content or control the content to be transmitted using a uniform resource identifier of the content.

The content reproducing apparatus of the other party may set channels based on the channel setting information included in the received virtual channel metadata. When the content reproducing apparatus selects the predetermined virtual channel, at least one piece of content corresponding to the predetermined virtual channel may be reproduced based on reproduction state information of content included in the virtual channel metadata.

Thus, the content reproducing apparatus of the other party may reproduce content shared in the same environment, i.e., the same channel setting and reproduction state, as the content reproducing apparatus 100 that provides the content.

According to an exemplary embodiment of the present invention, the content reproducing apparatus 100 may further include a channel selection guide reproduction unit (not shown) that generates a channel selection guide for displaying the set channels that include a virtual channel and an occupied basic channel and reproduces the channel selection guide. The channel selection unit 130 may receive a channel selection signal from a user by using the channel selection guide.

According to an exemplary embodiment of the present invention, the channel selection guide reproduction unit may display information related to a plurality of pieces of content corresponding to the set channels and the reproduction states of the pieces of content, as a channel selection menu.

According to an exemplary embodiment of the present invention, the channel selection guide reproduction unit may display a menu for deleting a channel from among a virtual channel and an occupied basic channel, a menu for combining channels, a menu for dividing a channel, a menu for adding a new virtual channel, a menu for naming a virtual channel, and so on, as channel management menus.

According to an exemplary embodiment of the present invention, the channel selection guide reproduction unit may display a menu for transmitting metadata containing channel setting information and reproduction state information of content to an external location, a menu for transmitting content, a menu for accessing a hub site, a menu for calling the other party, a menu for allowing the other party access, a menu for chatting, and a menu for remotely controlling the content reproducing apparatus of the other party, as network communications menus.

According to an exemplary embodiment of the present invention, the channel selection guide reproduction unit may display a menu for editing content and a menu for capturing content, as content reproduction management menus.

The content reproducing apparatus 100 may include a memory (not shown) for temporarily storing content received from an external source. Even if a source of the content, which has accessed the content reproducing apparatus 100, is separated from the content reproducing apparatus 100, the content may be reproduced since it has been temporarily stored in the memory.

Figure 1B:
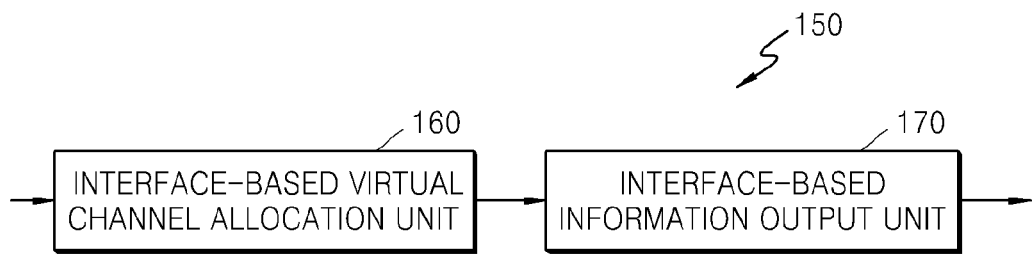
FIG. 1B is a block diagram of a content reproducing apparatus according to another exemplary embodiment of the present invention.

FIG. 1B is a block diagram of a content reproducing apparatus 150 according to another exemplary embodiment of the present invention. The content reproducing apparatus 150 includes an interface-based virtual channel allocation unit 160 and an interface-based information output unit 170.

The interface-based virtual channel allocation unit 160 allocates at least one virtual channel to each of at least one interface.

If a virtual channel is selected, the interface-based information output unit 170 outputs information received via an interface mapped to the virtual channel. The information received via the mapped interface includes streaming information or file information. If the streaming information is received via the interface, the interface-based information output unit 170 may output the streaming information.

When at least one piece of file information is received via the interface, the interface-based information output unit 170 may output the received file information. In this case, the content reproducing apparatus 150 may classify files into several file groups according to at least one attribute.

The interface-based virtual channel allocation unit 160 may allocate one virtual channel to each of the file groups. The allocated virtual channel may be a lower channel of the virtual channel allocated to the at least one interface. After one virtual channel is allocated to each of the groups, a virtual channel for a newly generated file group may be determined to be a lower channel of the already allocated virtual channel.

Figure 2:
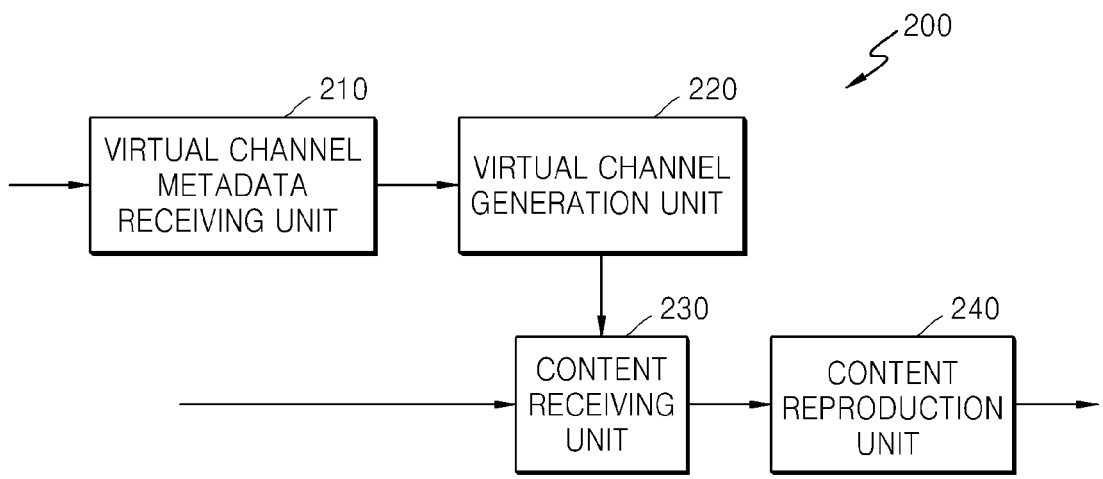
FIG. 2 is a block diagram of a content reproducing apparatus shared in a network according to an exemplary embodiment of the present invention.

FIG. 2 is a block diagram of a content reproducing apparatus 200 shared in a network according to an exemplary embodiment of the present invention. The content reproducing apparatus 200 reproduces content shared with the other party that is accessible via the network. The content reproducing apparatus 200 includes a virtual channel metadata receiving unit 210, a virtual channel generation unit 220, a content receiving unit 230 and a content reproduction unit 240.

According to an exemplary embodiment of the present invention, the virtual channel metadata receiving unit 210 receives virtual channel metadata that contains channel setting information of a content reproducing apparatus of the other party and reproduction state information of content from the content reproducing apparatus of the other party. Network sharing may be performed at the request of at least one of the content reproducing apparatus 200 and the content reproducing apparatus of the other party or may be performed via a mediator, such as a hub site. Also, channel setting or content may be shared by allowing the other party that provides the virtual channel metadata to access and remotely control the content reproducing apparatus 200 via the network.

As described above with reference to the content reproducing apparatus 100 of FIG. 1A, a virtual channel is allocated by the content reproducing apparatus 100 that provides metadata according to an attribute for content classification. If a plurality of pieces of content are received via different interfaces, different virtual channels are allocated to the pieces of content. Each of the virtual channels may be mapped to a plurality of pieces of content having the same attribute from among a plurality of pieces of content received via a plurality of interfaces.

The virtual channel generation unit 220 generates at least one virtual channel based on channel setting information included in the virtual channel metadata received by the virtual channel metadata receiving unit 210.

A channel of a content reproducing apparatus of a receiving side, e.g., the content reproducing apparatus 200, which is shared via a network is set based on channel setting information received from a metadata reproducing apparatus of a metadata provider, e.g., the content reproducing apparatus 100, but the set channel may not be given the same channel number as the content reproducing apparatus 100. Thus, the content reproducing apparatus 200 may determine to respectively allocate unoccupied channel numbers to virtual channels except for a basic channel.

The content receiving unit 230 receives at least one piece of content that corresponds to a channel from among a plurality of channels generated by the virtual channel generation unit 220. The content reproducing apparatus 200 may further include a channel selection guide generation unit (not shown) that generates a channel selection guide regarding all channels including virtual channels. When a predetermined virtual channel is selected using the channel selection guide, the content receiving unit 230 may receive at least one piece of content corresponding to the selected virtual channel.

The content receiving unit 230 may directly receive content from the content reproducing apparatus 100. According to an exemplary embodiment of the present invention, information regarding the location of the content may be detected based on the channel setting information included in the virtual channel metadata, and the content may be received using a uniform resource identifier based on the detected information.

If the content receiving unit 230 receives the uniform resource identifier from a provider of the virtual channel metadata, the content may be received using the uniform resource identifier. When network sharing is performed via a mediator, such as a hub site, the content receiving unit 230 may receive the content or the information regarding the location of the content from the hub site.

The content reproduction unit 240 reproduces the at least one piece of content received from the content receiving unit 230, based on reproduction state information of content that is included in the virtual channel metadata received by the virtual channel metadata receiving unit 210. Thus, the content reproducing apparatus 200 of the receiving side may reproduce the content according to the reproduction state of the content of the content reproducing apparatus 100 of the metadata provider.

That is, the content may be reproduced in the same environment in terms of a temporal state or a reproduction state of the content reproducing apparatus 100. The temporal state includes a point of time at which reproduction of the content starts or is discontinued. The reproduction state includes an application for executing the content or a reproduction screen configuration.

Figure 3:
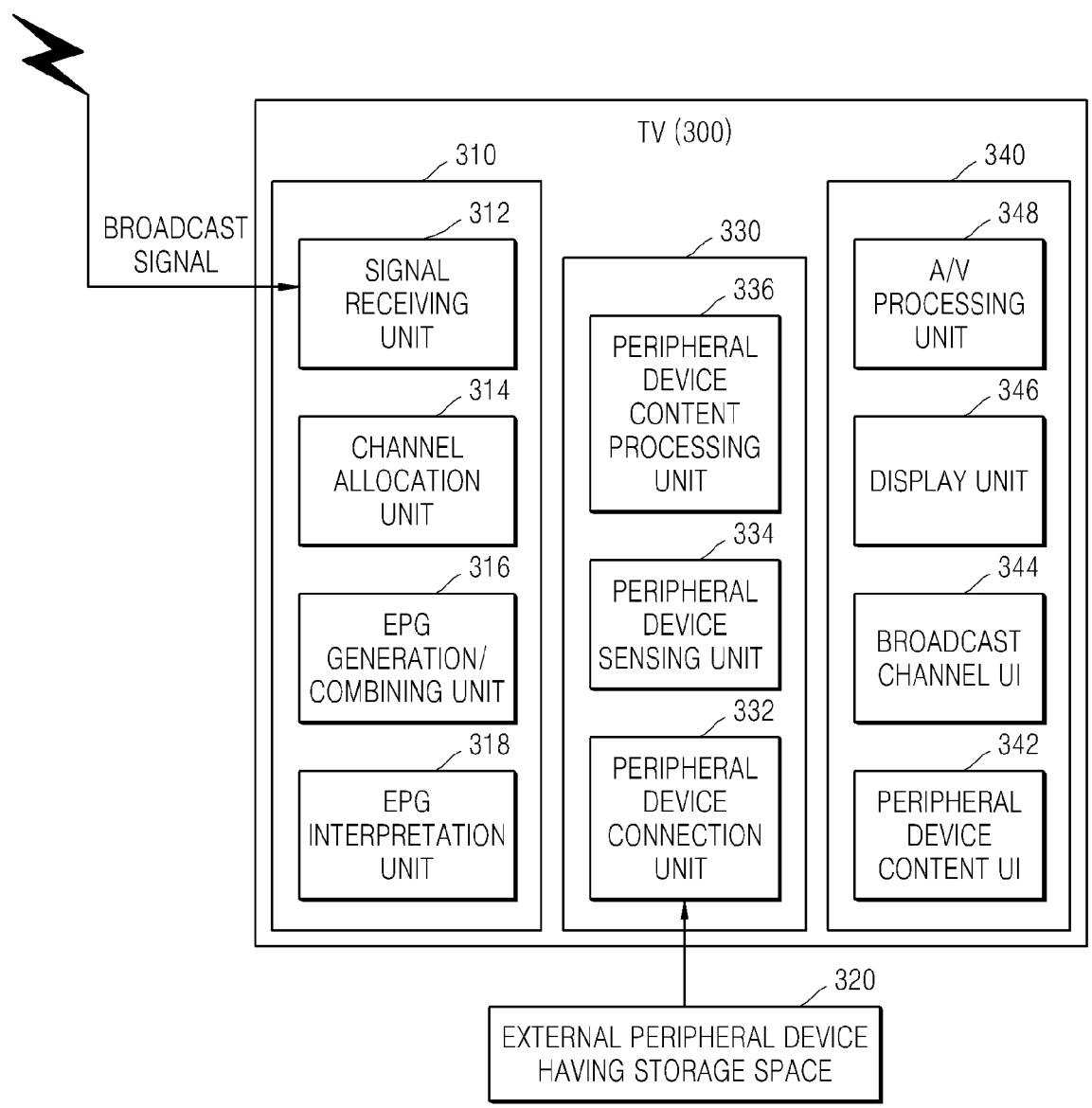
FIG. 3 is a block diagram of a related art content reproducing apparatus for reproducing content received from a peripheral device according to an exemplary embodiment of the present invention.

FIG. 3 is a block diagram of a related art content reproducing apparatus 300 for reproducing broadcast content received from a peripheral device according to an exemplary embodiment of the present invention. If the related art content reproducing apparatus 300 receives a broadcast signal and receives external content from an external peripheral device 320 having a storage space, a broadcast signal processing unit 310 processes the broadcast signal and an external content processing unit 330 processes the external content.

In detail, the broadcast signal processing unit 310 includes a signal receiving unit 312, a channel allocation unit 314, an EPG generation/combining unit 316, and an EPG interpretation unit 318. The signal receiving unit 310 receives a broadcast signal, the channel allocation unit 314 allocates a channel to the broadcast signal, and the EPG generation/combining unit 316 newly generates an EPG presenting information regarding the channel and broadcast content or combines this information with information included in the existing EPG. The EPG interpretation unit 318 interprets the resultant EPG in order to provide a user with this information.

The external content processing unit 330 includes a peripheral device connection unit 332, a peripheral device sensing unit 334 and a peripheral device content processing unit 336. The external peripheral device 320 is connected to the peripheral device connection unit 332 and is sensed by the peripheral device sensing unit 334. The peripheral device content processing unit 336 performs various preprocessing operations in order to reproduce the external content in the related art content reproducing apparatus 300.

A reproduction management unit 340 includes a peripheral device content user interface (UI) 342 for receiving user input regarding external content received from the peripheral device 320, a broadcast channel UI 344 for receiving user input regarding a broadcast signal, an audio/video (A/V) processing unit 348 that processes an audio/video signal of selected broadcast content or the external content, and a display unit 346 that reproduces and displays the selected broadcast signal or external content.

That is, in the related art content reproducing apparatus 300, the peripheral device content UI 342 is separated from the broadcast channel UI 344 in order to reproduce the content received from the external peripheral device 320. Thus, a user should select a broadcast channel by using the broadcast channel UI 344 in order to reproduce the broadcast content, and should select a channel by using the peripheral device content UI 342 in order to reproduce external content.

Accordingly, different UIs should be called in order to reproduce external content while watching a broadcast channel and vice versa. In general, since the broadcast channel UI 344 and the peripheral device content UI 342 are manually handled in different ways, a user who is accustomed to handling only the broadcast channel UI 344 and not the peripheral device content UI 342 would have difficulties reproducing external content.

Figure 4:
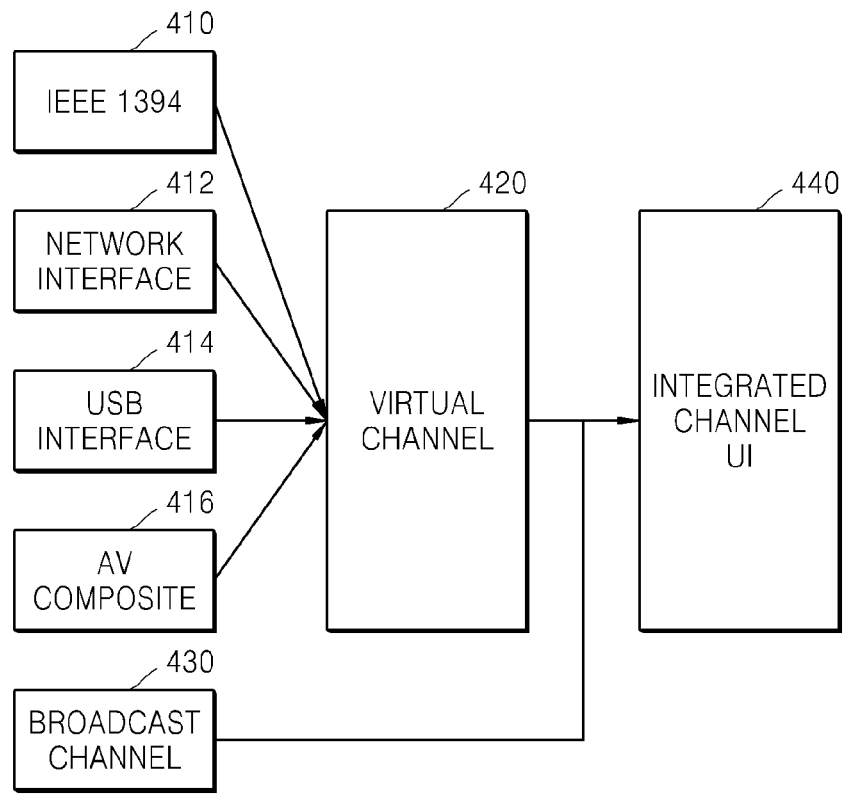
FIG. 4 is a block diagram of a plurality of virtual channels allocated to interfaces of a content reproducing apparatus and a channel selection guide according to an exemplary embodiment of the present invention.

FIG. 4 is a block diagram of a plurality of virtual channels allocated to interfaces of a content reproducing apparatus and a channel selection guide according to an exemplary embodiment of the present invention.

According to an exemplary embodiment of the present invention, in order to manage content that may be reproduced in an integrated way, the content reproducing apparatus 100 of FIG. 1A allocates a virtual channel to an external input interface in a similar manner that a broadcast channel is allocated to a broadcast signal.

Thus, a plurality of virtual channels 420 may be allocated to various interfaces, such as an IEEE 1394 interface 410, a network interface 412, a USB interface 414, and an AV composite interface 416, and the virtual channels 420 and a broadcast channel 430 may be managed using an integrated channel UI 440. The integrated channel UI 440 is an example of the channel selection guide described above.

Figure 5:
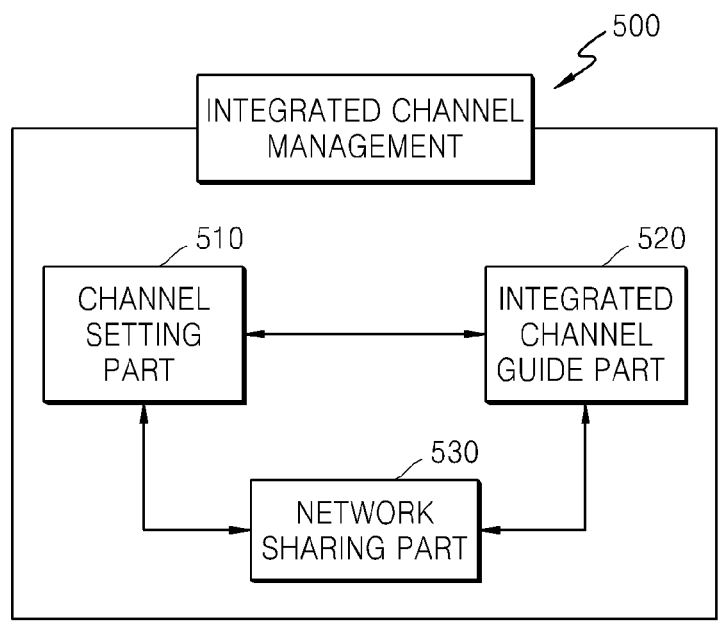
FIG. 5 is a block diagram schematically illustrating integrated channel management of a content reproducing apparatus according to an exemplary embodiment of the present invention.

FIG. 5 is a block diagram schematically illustrating integrated channel management of a content reproducing apparatus according to an exemplary embodiment of the present invention.

Referring to FIG. 5, the content reproducing apparatus 100 of FIG. 1A may be characterized by an integrated channel management performance 500. For integrated channel management of content, the integrated channel management performance 500 is largely divided into three parts: a channel setting part 510, an integrated channel guide part 520 and a network sharing part 530.

The channel setting part 510 not only allocates a basic channel to a received broadcast signal but also allocates virtual channels to respectively a plurality of pieces of content received via a plurality of interfaces, thereby allocating channels to all pieces of content that may be reproduced. The channel setting part 510 may generate channel setting information, e.g., allocation of virtual channels and the attribute(s) of content to which the virtual channels are mapped. The channel setting part 510 corresponds to the content classification unit 110 and the virtual channel allocation unit 120 of the content reproducing apparatus 100.

For a consistent manner in which a user may access the basic channel and the virtual channels, the integrated channel guide part 520 generates and manages a channel selection guide. The channel selection guide presents either the channel setting information that is generated by the channel setting part 510 to specify the basic channel and the virtual channels mapped to the pieces of content or reproduction state information of the pieces of content.

The channel setting information may be updated when the channel setting is changed, and the reproduction state information may be updated when the reproduction states of the pieces of content are changed. The integrated channel guide part 520 corresponds to the channel selection unit 130 and the channel selection guide generation unit of the content reproducing apparatus 100.

By using the channel setting part 510 and the integrated channel guide part 520, a user may reproduce externally input content by searching for a virtual channel corresponding to the externally input content in the same manner in which internally input content, such as broadcast content, is reproduced. Thus, the user does not have to learn a way of handling an additional user interface for running the externally input content.

The network sharing part 530 enables a first user to share channel setting information and content reproduction state information of a first content reproducing apparatus of the first user, with a second user, through the channel setting part 510 and the integrated channel guide part 520. Based on the channel setting information and content reproduction state information of the first content reproducing apparatus, content corresponding to a predetermined channel of the first content reproducing apparatus may be reproduced in a second content reproducing apparatus of the second user. Also, the corresponding content may be reproduced in the second content reproducing apparatus in a similar manner in which it was reproduced in the first content reproducing apparatus. The network sharing part 530 corresponds to the network share unit of the content reproducing apparatus 100.

Accordingly, the content reproducing apparatus 100 is capable of effectively reproducing and using a plurality of pieces of content that may be reproduced by organically operating the channel setting part 510, the integrated channel guide part 520 and the network sharing part 530.

The operation of the channel setting part 510 will be described in detail with reference to FIGS. 6 to 12. The operation of the integrated channel guide part 520 will be described in detail with reference to FIGS. 13 to 16. The operation of the network sharing part 530 will be described in detail with reference to FIGS. 17 to 19.

First, the following terms will be used to describe channels employed in exemplary embodiments of the present invention for convenience of explanation.

The term, 'total channels' indicates all channels that may be employed as channels by the content reproducing apparatus 100.

The term, 'occupied channel' indicates a channel already occupied by content in the content reproducing apparatus 100, and thus is not changed through user setting.

The term, 'basic channel' is a channel mapped to a broadcast content provided from a broadcasting station and thus may also be understood as a 'broadcast channel'. A basic channel may be included in an occupied channel.

The term, 'virtual channel' is a channel mapped to externally input content and is thus selected from among unoccupied channels of the total channels, except for an occupied channel.

The term, 'set channel' includes an occupied channel and a virtual channel, and is mapped to content.

Figure 6:
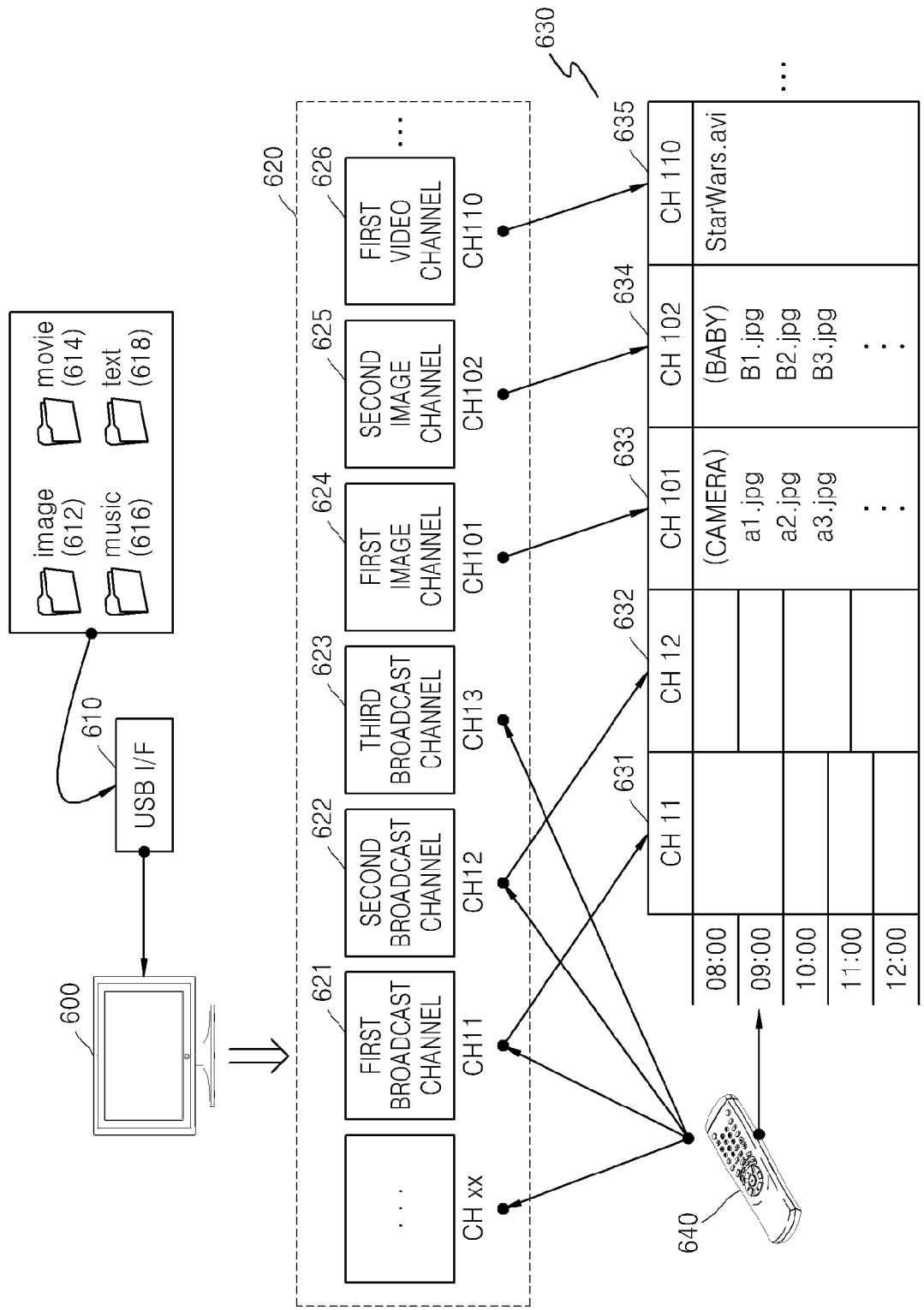
FIG. 6 illustrates a plurality of pieces of content that are classified and channels that are set according to file/folder characteristics according to an exemplary embodiment of the present invention.

FIG. 6 illustrates a plurality of pieces of content that are classified and channels that are set according to file/folder characteristics according to an exemplary embodiment of the present invention.

Referring to FIG. 6, content is received via a USB interface 610 of a content reproducing apparatus 600. In the USB interface 610, the content is stored in an 'image' folder 612 in the form of an image file, is stored in a 'movie' folder 614 in the form of a moving picture file, is stored in a 'music' folder 616 in the form of an audio file, or is stored in a 'text' folder 618 in the form of a text file.

However, according to an exemplary embodiment of the present invention, the content reproducing apparatus 600 classifies a plurality of pieces of content, independently from the file and folder structures in the USB device connected to the USB interface 610. The content reproducing apparatus 600 determines the attributes of the pieces of content, determines a reference attribute for content classification, and classifies the pieces of content into several groups according to their attributes.

In an exemplary embodiment, a plurality of pieces of content are classified according to their file/folder characteristics. For example, it is assumed that a plurality of pieces of content are classified according to folders and then a plurality of pieces of content stored in files belonging to a predetermined folder are classified according to a content obtaining device or the contents of each of the plurality of pieces of content. Referring of FIG. 6, a plurality of pieces of contents received via the USB interface may be first classified into those stored in the 'image' folder 612 and those in the 'movie' folder 614. Next, the pieces of content in the 'image' folder 612 may be classified into those captured by a content obtaining device, e.g., a camera, and then, the classified pieces of the content may be classified into an image content group according to the contents thereof, e.g., a group of images obtained by photographing a 'baby'.

From among total channels 620 of the content reproducing apparatus 600, a first broadcast channel CH11 621, a second broadcast channel CH12 622, and a third broadcast channel CH13 623 are occupied channels. Virtual channels, e.g., a virtual channel CH101 624, a virtual channel CH102 625, and a virtual channel CH110 626, may be determined from among other unoccupied channels in the total channels 620, and then, different content groups may be respectively mapped to these virtual channels.

For example, the virtual channel CH101 624 may be a first image channel and be mapped to an image content group that was captured by a camera and belong to the 'image' folder 612. The virtual channel CH102 625 may be a second image channel and be mapped to an image content group that was obtained by photographing a baby and belong to the 'image' folder 612. The virtual channel CH110 626 may be a first video channel and may be mapped to video content 'StarWars.avi' belonging to the 'movie' folder 614.

Also, the content reproducing apparatus 600 may provide a channel selection guide 630. The channel selection guide 630 includes an EPG regarding broadcast channels, and additionally includes information regarding a plurality of content being respectively allocated to virtual channels.

That is, the channel selection guide 630 may provide a broadcast program table based on the existing EPG regarding a broadcast channel 631 and a second broadcast channel 632, and display a plurality of pieces of content being respectively mapped to a first image channel 633, a second image channel 634, and a first video channel 635 based on channel setting information regarding the first image channel 633, the second image channel 634, and the first video channel 635.

A user may select a desired channel from among the total channels 620 including the set channels 621 through 626 by searching the channel selection guide 630 by using a remote controller 640 and according to the same method of manipulating the EPG regarding broadcast channels. For example, a desired channel may be selected from among the total channels 620 including all the set channels by pressing an up/down button or a left/right button in order to move from one channel to another channel or by pressing an 'OK' button in order to select the desired channel.

A pointing device, a touch-based input device, or a user control device that uses a lower reproduction device may be used instead of the remote controller 640.

A plurality of reference attributes may be determined for content classification, and the reference attributes may not be necessarily contradictory to each other. Even if a plurality of pieces of content are classified into several content groups according to attributes, one piece of content having two or more attributes may belong to two or more content groups.

For example, it is assumed that two reference attributes for content classification, e.g., 'content that was generated on Dec. 25, 2007' and 'image-type content', are determined. Then, the attributes of a plurality of pieces of content that are input from an external source to the content reproducing apparatus 600 may be analyzed, and the pieces of content are categorized into a first content group to which content generated on Dec. 25, 2007 belongs and a second content group to which image-type content belongs. If content A is image type content that was generated on Dec. 25, 2007 from among the pieces of content, the content A belongs to both the first and second content groups. Thus, the content A may be mapped to both a first channel mapped to the first content group and a second channel mapped to the second content group.

Figure 7:
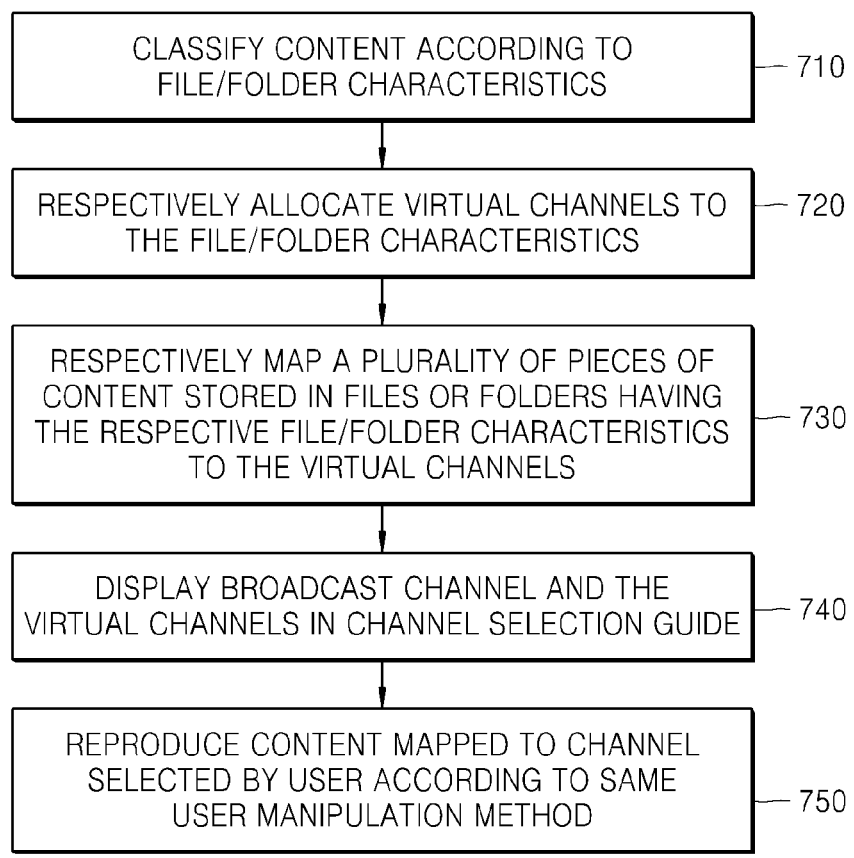
FIG. 7 is a flowchart illustrating a method of classifying content and setting channels according to file/folder characteristics according to an exemplary embodiment of the present invention.

FIG. 7 is a flowchart illustrating a method of classifying content and setting channels according to file/folder characteristics according to an exemplary embodiment of the present invention. In operation 710, a plurality of pieces of content received via an interface are classified according to file/folder characteristics. In operation 720, virtual channels are respectively allocated to the file/folder characteristics. In operation 730, a plurality of pieces of content being respectively stored in files or folders having the respective file/folder characteristics are respectively mapped to the virtual channels. In operation 740, a broadcast channel which is an occupied channel, and the virtual channels are indicated (displayed) together in a channel selection guide. In operation 750, a user selects a desired channel based on the channel selection guide and according to a consistent user manipulation method, and reproduces content mapped to the selected channel.

Figure 8:
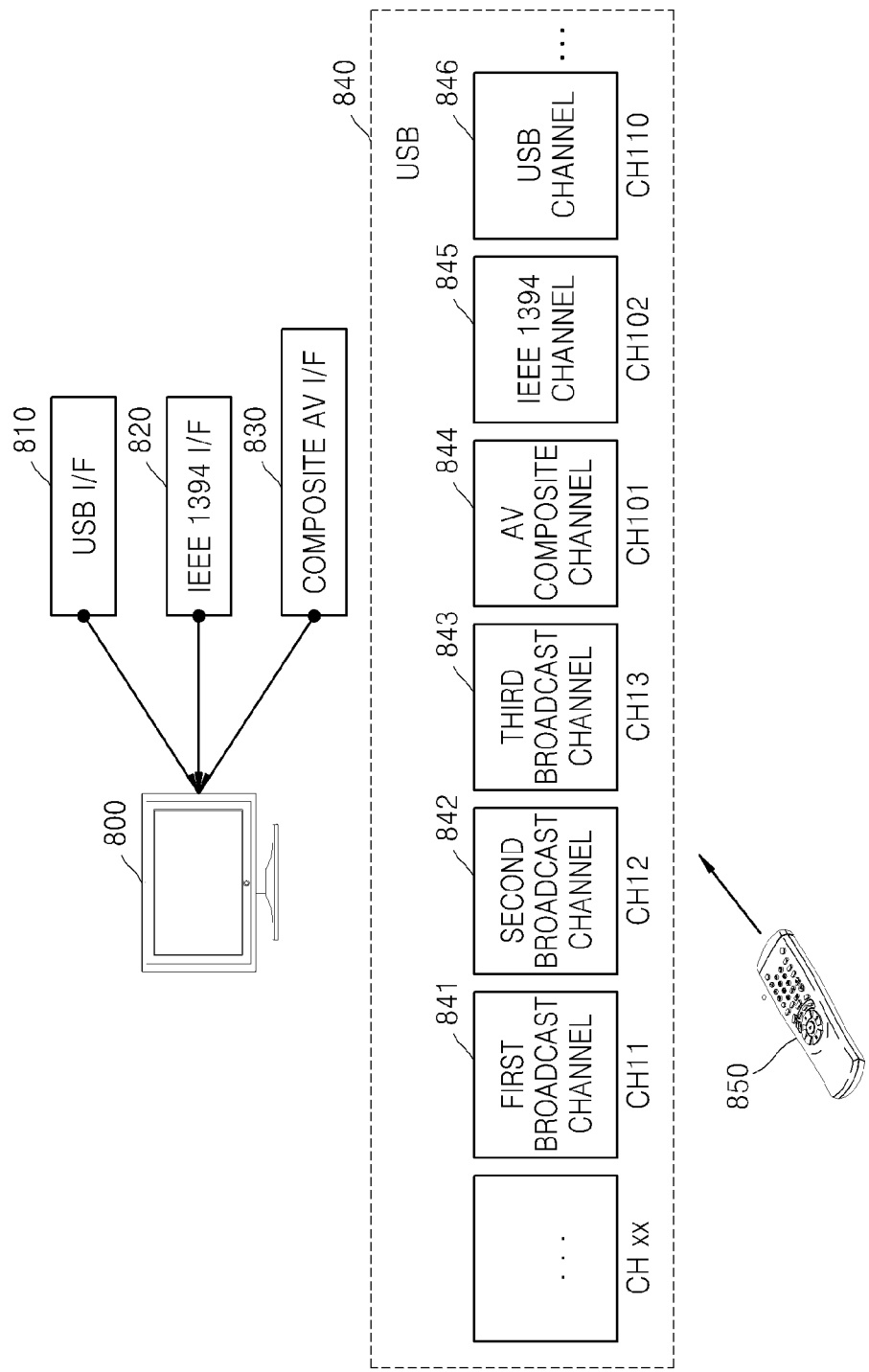
FIG. 8 is a block diagram illustrating content classification and channel setting based on interface type according to an exemplary embodiment of the present invention.

FIG. 8 is a block diagram illustrating content classification and channel setting based on interface type according to an exemplary embodiment of the present invention. A content reproducing apparatus 800 is connected to an external memory via a USB interface 810, an IEEE 1394 interface 820, or a composite AV interface 830 in order to receive content from the external memory. If a reference attribute for content classification is interface type, content may be classified into a first content group to which content received via the USB interface 810 belongs, a second content group to which content received via the IEEE 1394 interface 820 belongs, and a third content group to which content received via the composite AV interface 830 belongs.

From among total channels 840 that the content reproducing apparatus 800 may access, a first broadcast channel CH11 841, a second broadcast channel CH12 842, and a third broadcast channel CH13 843 are occupied channels, and different content groups may be respectively mapped to a virtual channel CH101 844, a virtual channel CH102 845, and a virtual channel CH110 846. For example, the virtual channel CH101 844 may be an AV composite channel and may be mapped to the third content group, and the virtual channel CH102 845 may be an IEEE 1394 channel and may be mapped to the second content group. Also, the virtual channel CH110 846 may be a USB channel and may be mapped to the first content.

Although not shown in the drawings, an upper content group of a plurality of pieces of content received via a predetermined interface may be classified into lower content groups, and channels may be respectively allocated to the upper content group and the lower content groups. In this case, channel numbers that are close to one another or having a hierarchical structure may be allocated to the channels of the upper content group and the lower content groups.

For example, if the upper content group is given a channel number of 110, the lower content groups may be respectively given channel numbers of 111, 112, and 113 that are a series of consecutive numbers. Also, if the upper content group is given a channel number of 101, the lower content groups may be respectively given channel numbers of 101-1, 101-2, and 101-3.

A user may select one channel from among the total channels 840, which include the set channels 841, 842, 843, 844, 845, and 846, by using a remote controller 850 and according to the same method of manipulating the broadcast channels 841 to 843.

Figure 9:
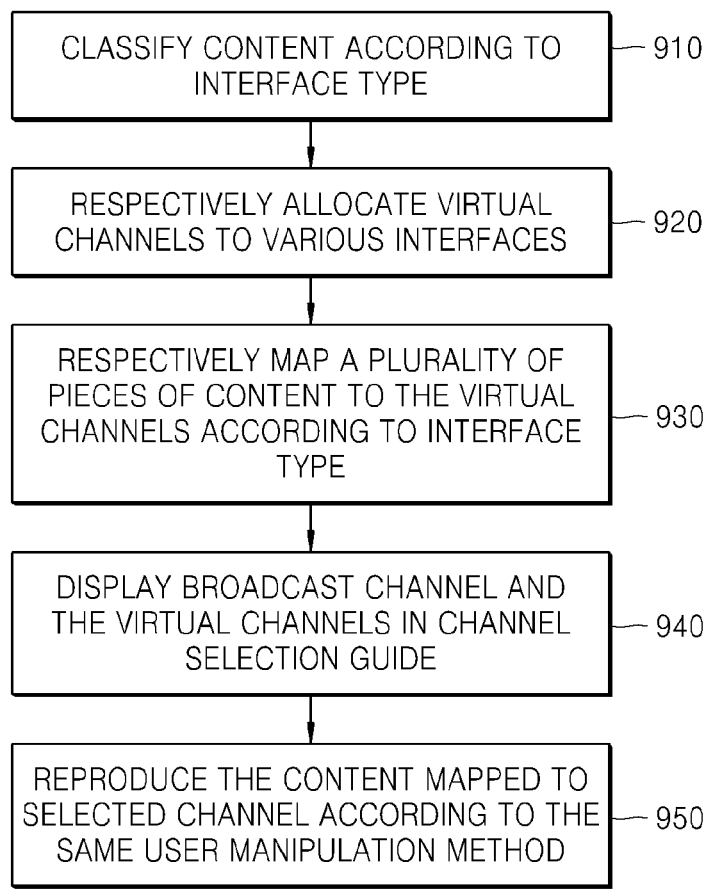
FIG. 9 is a flowchart illustrating a method of classifying content and setting channels based on interface type according to an exemplary embodiment of the present invention.

FIG. 9 is a flowchart illustrating a method of classifying content and setting channels based on interface type according to an exemplary embodiment of the present invention. In operation 910, a plurality of pieces of content received via various interfaces are classified according to interface type. In operation 920, a plurality of virtual channels are respectively allocated to the various interfaces. In operation 930, the pieces of content are respectively mapped to the virtual channels according to interface type. In operation 940, a broadcast channel which is an occupied channel and the virtual channels are displayed together in a channel selection guide. In operation 950, a user selects a desired channel based on the channel selection guide and according to the same user manipulation method, and then reproduces the content mapped to the selected channel.

Figure 10:
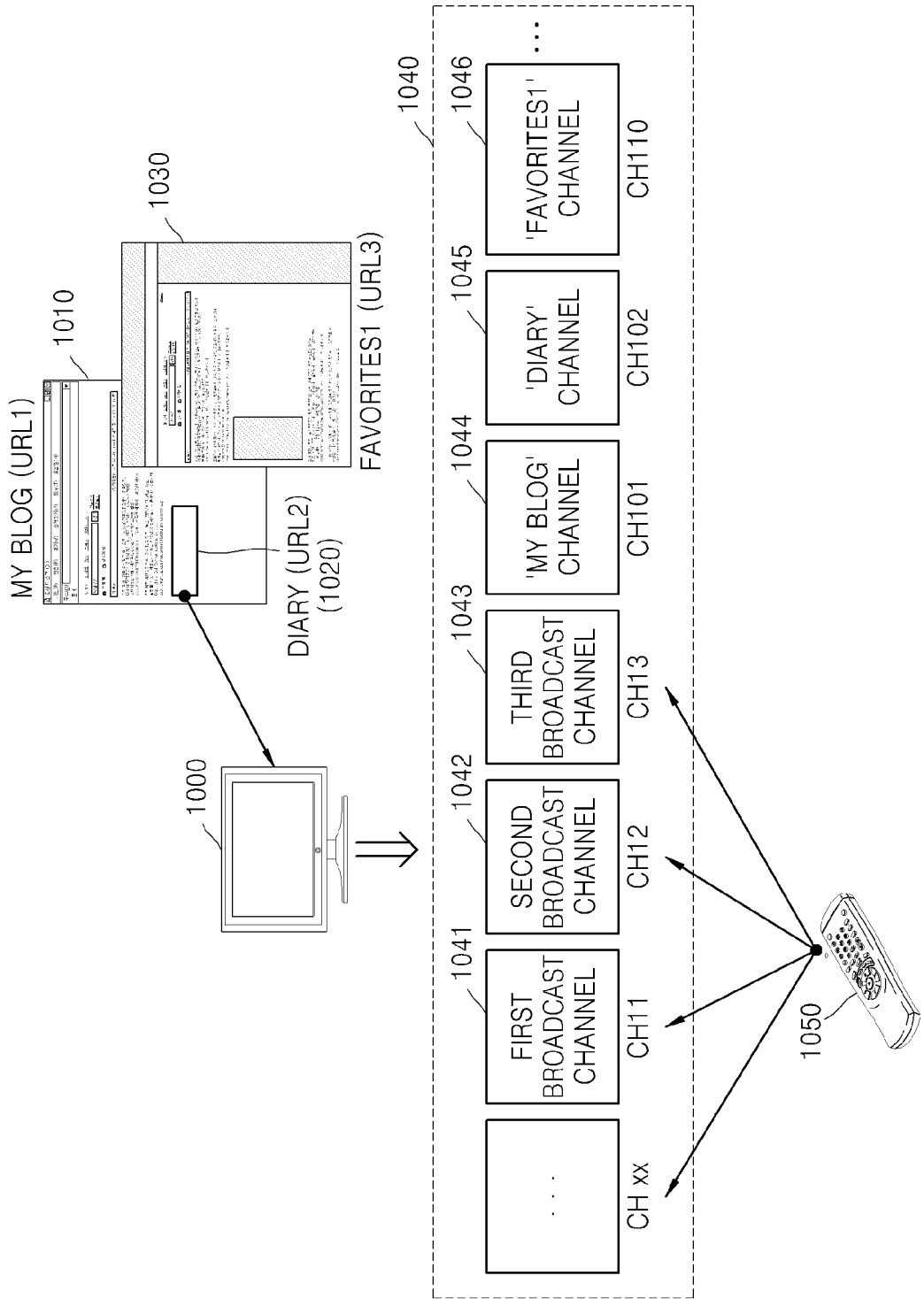
FIG. 10 is a block diagram illustrating content classification and channel setting based on an Internet identification address according to an exemplary embodiment of the present invention.

FIG. 10 is a block diagram illustrating content classification and channel setting based on an Internet identification address according to an exemplary embodiment of the present invention. Web content may be input to a content reproducing apparatus 1000 via a network interface. The web content may be a web site, a web page, or various multimedia, such as an image, video or audio on a web. For example, the web content may include a 'my blog' web site 1010, a 'diary' web site 1020 which is a subcategory of the 'my blog' web site 1010, and a 'favorites 1' web site 1030 which is determined to be a frequently visited site.

A reference attribute for content classification may be a URI, such as a universal resource locator (URL), and a reference attribute for web content classification may be a hierarchical relationship between uniform resource identifiers. For example, content may be classified into a first content group to which the 'my blog' web site 1010 that was accessed using a first URI URL1 belongs, a second content group to which the 'diary' web site 1020 that was accessed using a second URI URL2 belongs, and a third content group to which the 'favorites 1' web site 1030 that was accessed using a third URI URL3 belongs.

From among total channels 1040 of the content reproducing apparatus 1000, a first broadcast channel CH11 1041, a second broadcast channel CH12 1042, and a third broadcast channel CH13 1043 are occupied channels, and different content groups may be respectively mapped to a virtual channel CH101 1044, a virtual channel CH102 1045, and a virtual channel CH110 1046. For example, the virtual channel CH101 1044 may be a 'my blog' channel and be mapped to the first content group, the virtual channel CH102 1045 may be a 'diary' channel and be mapped to the second content group, and the virtual channel CH110 1046 may be a 'favorites 1' channel and be mapped to the third content.

Accordingly, a user may select one channel from among the total channels 1040 including the set channels 1041 to 1046 according to the same method of manipulating broadcast channels and by using a remote controller 1050.

Figure 11:
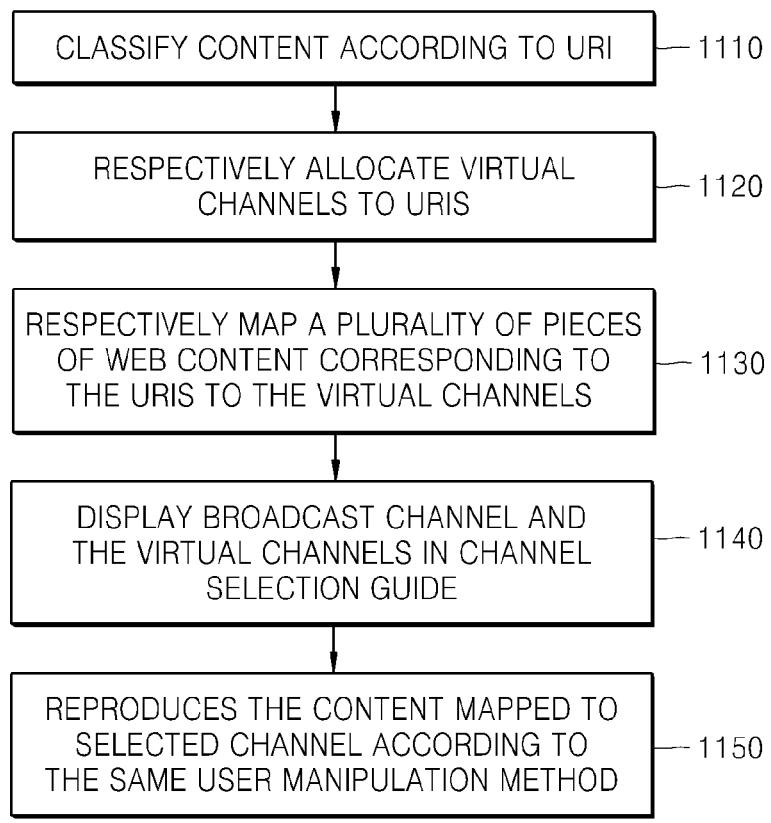
FIG. 11 is a flowchart illustrating a method of classifying content and setting channels based on an Internet identification address according to an exemplary embodiment of the present invention.

FIG. 11 is a flowchart illustrating a method of classifying content and setting channels based on an Internet identification address according to an exemplary embodiment of the present invention. In operation 1110, a plurality of pieces of content received via various interfaces are classified according to a URI. In operation 1120, a plurality of virtual channels are respectively allocated to a plurality of URIs. In operation 1130, a plurality of pieces of web content corresponding to the URIs are respectively mapped to the virtual channels. In operation 1140, a broadcast channel which is an occupied channel, and the virtual channels are displayed together in a channel selection guide. In operation 1150, a user selects a desired channel from among the channels based on the channel selection guide and according to the same user manipulation method, and reproduces the content mapped to the selected channel.

Figure 12:
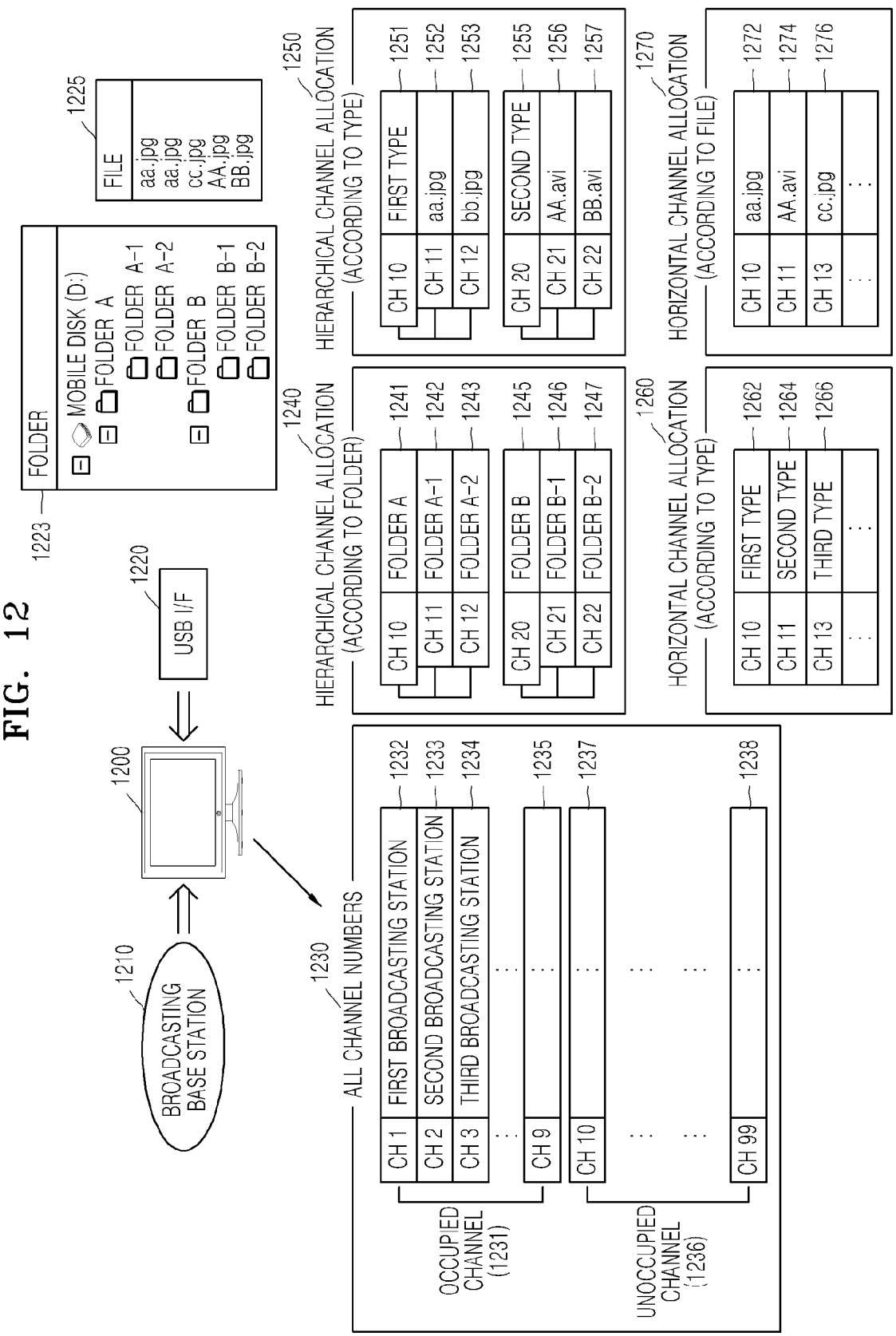
FIG. 12 illustrates setting of virtual channels according to an exemplary embodiment of the present invention.

FIG. 12 illustrates setting of virtual channels according to an exemplary embodiment of the present invention. A content reproducing apparatus 1200 may receive broadcast content from a broadcasting base station 1210, and receive externally input content via a USB interface 1220. In the USB interface 1220, the externally input content is stored in the form of a folder list 1223 and a file list 1225.

From among total channel numbers 1230 of a content reproducing apparatus 1200, channel numbers are allocated to a first channel 1232, a second channel 1233, a third channel 1234, . . . , through to a ninth channel 1235 as occupied channels 1231 which are broadcast channels, and channel numbers are allocated to a tenth channel 1237 to a ninety-ninth channel 1238 as unoccupied channels 1236. A virtual channel is selected from among the unoccupied channels 1236, and thus, a channel number may be allocated to the virtual channel in various ways.

For example, if a plurality of pieces of content are classified according to a folder, then they may be classified into content groups being respectively mapped to a folder A, sub folders A-1 and A-2 that are subject to the upper folder A, a folder B, and sub folders B-1 and B-2 that are subject to the upper folder B. The content stored in each of the folder A, the sub folders A-1 and A-2, the sub folder B, and the sub folders B-1 and B-2 belongs to the mapped content group. Also, the content groups may be respectively given channel numbers.

For example, if the pieces of content are classified according to media type, then they may be classified into a first type (image type) content group and a second type (video type) content group.

For example, if the pieces of content are classified into several content groups according to a hierarchical channel allocation method, then channel numbers are respectively allocated to channels in a hierarchical manner based on the hierarchical structure of a reference attribute for content classification.

In a folder-based hierarchical channel allocation method 1240, a channel number is determined according to a hierarchical structure of a folder. Thus, a channel CH10 1241 and a channel CH20 1245 may be respectively allocated to the content groups belonging to the folders A and B. A channel CH11 1242 and channel CH12 1243, the channel numbers of which are subsequent to that of the channel CH10 1241 may be respectively allocated to the sub folders A-1 and A-2 subject to the folder A. Similarly, the sub folders B-1 and B-2 subject to the folder B may be respectively allocated a channel CH21 1246 and a channel CH22 1247, the channel numbers of which are subsequent to that of the channel CH20 1245.

In a media type-based hierarchical channel allocation method 1250, a channel number is determined according to the media type of content. If a content group including at least one piece of content of the same media type is allocated to a channel, a piece of content selected from the content group may be allocated to a sub channel.

The image type (first type) content group and the video type (second type) content group are upper groups and may be respectively allocated a channel CH10 1251 and a channel CH20 1255. Image content 'aa.jpg' and 'bb.jpg' subject to the image type content group may be respectively allocated a channel CH11 1252 and a channel CH12 1253, the channel numbers of which are subsequent to that of the channel CH10 1251. Similarly, video content 'AA.avi' and 'BB.avi' subject to the video type content group may be respectively allocated a channel CH21 1256 and a channel CH22 1257, the channel numbers of which are subsequent to that of channel CH20 1255.

Alternatively, N, N-1, N-2, N-1-1, and the like may be allocated as hierarchical channel numbers.

In a horizontal channel allocation method, channel numbers are arranged in regular order and irrespective of a hierarchical structure thereof. For example, in a media type-based horizontal channel allocation method 1260, a first media type content group, a second media type content group, and a third media type content group may be respectively allocated a channel CH10 1262, a channel CH11 1264, and a channel CH13 1266. In a file-based horizontal channel allocation method 1270, the content 'aa.jpg', 'AA.avi', and 'cc.jpg' may be respectively allocated a channel CH10 1272, a channel CH11 1274, and a channel CH13 1276. In this case, a user may arbitrarily determine the order of channels to be allocated to files.

If new content or file groups are further determined after determining content or file groups, virtual channels may be allocated to the new content or file groups in various ways. For example, a channel 100 is allocated to a USB interface, files having an '.avi' extension and an '.mpg' extension are received via the USB interface, a channel 101 is allocated to a group of files having the '.avi' extension, and a channel 102 is allocated to a group of files having the '.mpg' extension.

If files having a '.jpg' extension are newly received via the USB interface, the group of files having the '.jpg' extension may be allocated a channel 103. However, it is assumed that the channel 103 has already been allocated to an HDMI interface. In this case, the virtual channel allocation unit 120 of FIG. 1A or 160 of FIG. 1B may change a virtual channel allocated to the HDMI interface to a subsequent channel, e.g., a channel 104, and may allocate the channel 103 to the new group of files received via the USB interface. Alternatively, the virtual channel allocation unit 120 or 160 may allocate the new group of files a virtual channel that is closest to the channel 103 from among spare channels except for a virtual channel allocated to another file group or another interface.

Otherwise, in order to prevent collision of virtual channels, when a new group of files is generated, upper virtual channels may be allocated at regular intervals and lower virtual channels may be allocated only between upper virtual channels. For example, an upper virtual channel may be allocated to every fifth or tenth file.

When new file or content groups are added and thus lower virtual channels corresponding thereto need to be added, the number of the new file or content groups may be limited so that they may be allocated to only upper virtual channels. If the number of file or content groups generated exceeds a predetermined number, lower virtual channels which are subject to the same upper virtual channel and are to be allocated content groups may be combined together. Also, in this case, spare virtual channels may be additionally determined to be allocated to excessive file or content groups.

Figure 13:
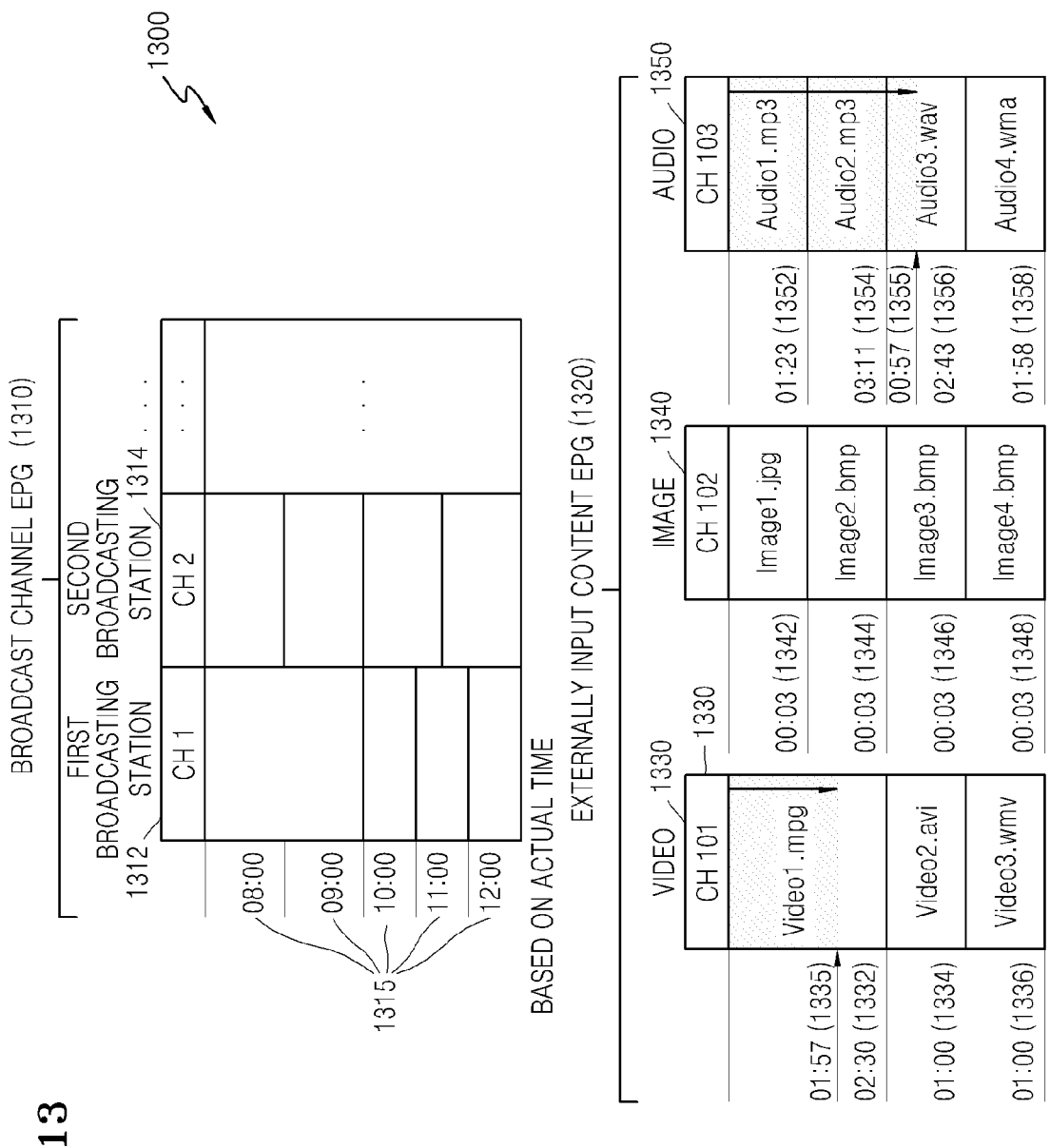
FIG. 13 illustrates a channel selection guide providing a running time of content according to an exemplary embodiment of the present invention.

FIG. 13 illustrates a channel selection guide 1300 providing a running time of content according to an exemplary embodiment of the present invention. A channel selection guide generation unit (not shown) generates the channel selection guide 1300 for integrated channel management by combining a broadcast channel EPG 1310 with an externally input content EPG 1320.

The broadcast channel EPG 1310 displays information regarding broadcast content broadcast via a channel CH1 1312 transmitted from a first broadcasting station and a channel CH2 1314 transmitted from a second broadcasting station. Time information 1315 of the broadcast channel EPG 1310 is based on actual time.

In an exemplary embodiment of the present invention, the externally input content EPG 1320 displays information regarding virtual channels allocated to content groups that are classified according to media type. That is, a video type content group is allocated a virtual channel CH101 1330, an image type content group is allocated a virtual channel CH102 1340, and an audio type content group is allocated a virtual channel CH103 1350.

In an exemplary embodiment of the present invention, time information of the externally input content EPG 1320 is based on media time. Also, times 1332, 1334, 1336, 1342, 1344, 1346, 1348, 1352, 1354, 1356, and 1358 when reproduction of a plurality of pieces of content respectively end, respectively denote running times of the pieces of content.

In an exemplary embodiment of the present invention, the externally input content EPG 1320 displays a point of time at which content reproduction is discontinued with respect to each channel. For example, if reproduction of video content 'Video1.mpg' received via the virtual channel CH101 1330 is discontinued at 01:57 1335, the time 01:57 1335 is recorded as the point of time at which reproduction is discontinued.

The point of time at which reproduction is discontinued is recorded as a current running time of the video content 'Video1.mpg'. For example, if reproduction of the content 'Audio3.wav' is discontinued during sequential reproduction of audio contents 'Audio1.mp3', 'Audio2.mp3' and 'Audio3.wav' received via the virtual channel CH103 1350, then a total time 00:57 1355 during which the content 'Audio3.wav' was reproduced is recorded as a point of time at which reproduction is discontinued.

A point of time at which reproduction is discontinued may be recorded with respect to not only when a reproducing operation of the content reproducing apparatus 100 of FIG. 1A is discontinued but also with respect to content corresponding to the original channel when the original channel is changed to a new channel. The point of time at which reproduction is discontinued may be used in order to resume the reproduction of the corresponding content. If the point of time at which reproduction is discontinued is included in running time information and the running time information is delivered to a third party through network sharing, then a user may allow the third party to reproduce the content that the user is currently reproducing.

According to an exemplary embodiment of the present invention, a user may select both a broadcast channel and a virtual channel by using the channel selection guide 1300 according to a consistent user manipulation method. Even if the user switches from a broadcast channel to a virtual channel while viewing broadcast content via the broadcast channel and vice versa, the user does not have to deactivate a user interface for reproduction of the broadcast content and to activate an additional user interface for reproduction of externally input content. For example, the user may easily switch from the broadcast channel to the virtual channel or from the virtual channel to the broadcast channel by pressing an up/down or a left/right button on a remote controller and the switching may be performed based on the channel selection guide.

Figure 14:
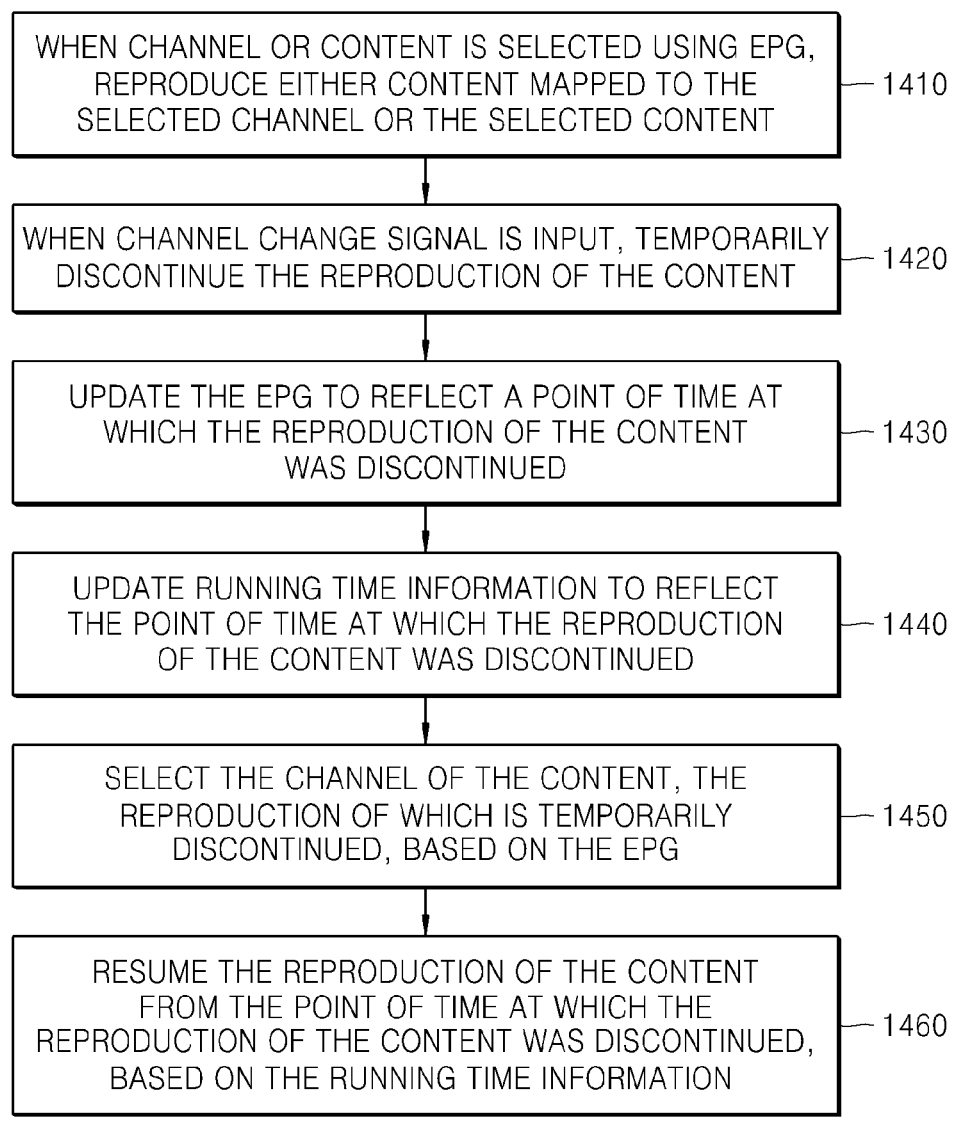
FIG. 14 is a flowchart illustrating a method of generating and updating content running time information according to an exemplary embodiment of the present invention.

FIG. 14 is a flowchart illustrating a method of generating and updating content running time information according to an exemplary embodiment of the present invention. In operation 1410, when a channel or content is selected using an EPG, such as a channel selection guide, either content mapped to the selected channel or the selected content is reproduced. In operation 1420, when a channel change signal is input, the reproduction of the content is temporarily discontinued. In operation 1430, the EPG is updated to reflect a point of time at which the reproduction of the content was discontinued. In operation 1440, running time information is updated to reflect the point of time at which the reproduction of the content was discontinued. In operation 1450, a user selects the channel of the content, the reproduction of which is temporarily discontinued, based on the EPG. In operation 1460, the reproduction of the content is resumed starting from the point of time at which the reproduction of the content was discontinued, based on the running time information.

Figure 15:
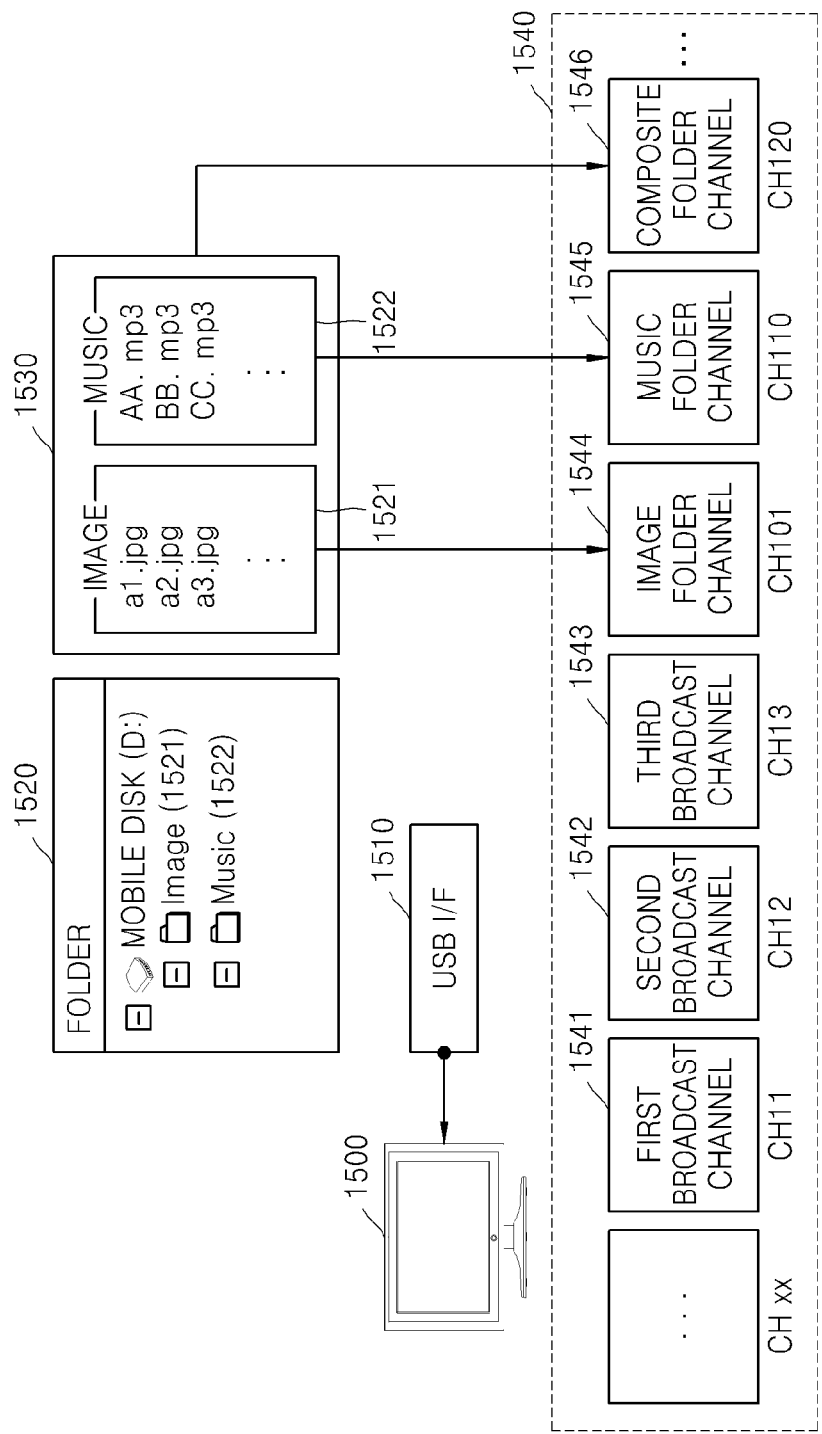
FIG. 15 is a block diagram illustrating a method of combining virtual channels according to an exemplary embodiment of the present invention.

FIG. 15 is a block diagram illustrating a method of combining virtual channels according to an exemplary embodiment of the present invention. Content is input to a content reproducing apparatus 1500 via a USB interface 1510 of the content reproducing apparatus 1500. In a USB device (not shown), a content folder structure 1520 includes an 'Image' folder 1521 and a 'Music' folder 1522. In a content file structure 1530, files having a 'jpg' extension are stored in an 'Image' folder 1521 and files having an 'mp3' extension are stored in a 'Music' folder 1522.

A content classification unit (not shown) of the content reproducing apparatus 1500 classifies content according to folder type. Thus, in the folder structure 1520 in the USB device, content stored in the 'Image' folder 1521 and content stored in the 'Music' folder 1522 are respectively classified into a first content group and a second content group.

From among total channels 1540 of the content reproducing apparatus 1500, a first broadcast channel CH11 1541, a second broadcast channel CH12 1542, and a third broadcast channel CH13 1543 may be occupied channels, and a virtual channel CH101 1544, a virtual channel CH110 1545, and a virtual channel CH120 1546 may be respectively mapped to different content groups.

The virtual channel CH101 1544 and the virtual channel CH110 1545 may be respectively mapped to the first content group and the second content group. Thus, the virtual channel CH101 1544 may be set as an 'Image' folder channel and the virtual channel CH110 1545 may be set as a 'Music' folder channel.

A virtual channel may be allocated to content obtained via a combination of different channels. For example, a composite folder channel 1546 may be obtained from a combination of the 'Image' folder channel 1544 and the 'Music' folder channel 1545. The composite folder channel 1546 is mapped to a content group to which content received via the 'Image' folder channel 1544 and content received via the 'Music' folder channel 1545 belong. The obtaining of the composite folder channel 1546 not only allows a plurality of pieces of content to be simply and sequentially reproduced, but also images and audio may be simultaneously reproduced.

FIG. 16 illustrates a method of reproducing content during channel switching according to an exemplary embodiment of the present invention. A first time axis 1610 is a time axis of a broadcast channel and denotes actual time. A second time axis 1620 and a third time axis 1630 are respectively a time axis of a first virtual channel and a time axis of a second virtual channel, and denote media time.

In a first reproduction method, when reproduction of content is resumed after channel switching, the content is reproduced again starting from a point at which the reproduction was discontinued. For example, if a user switches from a first virtual channel to a broadcast channel at media time 00:37:29 while viewing content received via a first virtual channel, a point of time 1630 at which the first channel switching is performed is recorded. The point of time 1630 is the same as a point of time 1623 at which the reproduction of the content received via the first virtual channel was discontinued. The actual time is 20:30:37 at the point of time 1630, when reproduction of content received via the broadcast channel begins.

The user views the content via the broadcast channel for a period of time 01:15:49 after the first channel switching, and switches again from the broadcast channel to the first virtual channel at the actual time 21:47:26. A point of time 1640 at which the second channel switching is performed is a point of time at which the reproduction of the content via the broadcast channel is discontinued and the reproduction of the content via the first virtual channel is resumed. The content via the first virtual channel is reproduced at a point of time 1625 right after the point of time 1623, based on information regarding the point of time 1623.

In a second reproduction method, when reproduction of content is resumed after channel switching, the content is reproduced again when a period of time during which the reproduction was actually discontinued elapses from a point at which the reproduction was discontinued. If a user switches from a second virtual channel to a broadcast channel at media time 00:37:29 during viewing of content received via the second virtual channel, a point of time 1630 that the first channel switching is performed is recorded. The point of time 1630 is the same as a point of time 1633 at which the reproduction of the content via the second virtual channel was discontinued.

The user views content via the broadcast channel for a period of time 01:16:49 after the first channel switching, and switches again from the broadcast channel to the second virtual channel at the actual time 21:47:26. The content via the second virtual channel is reproduced again at time 01:54:19, i.e., at a point of time 1635, when a period of time 01:16:49 during which the reproduction of the content via the second virtual channel was discontinued elapses from the point of time 1633, based on information regarding the point of time 1633.

Figure 17:
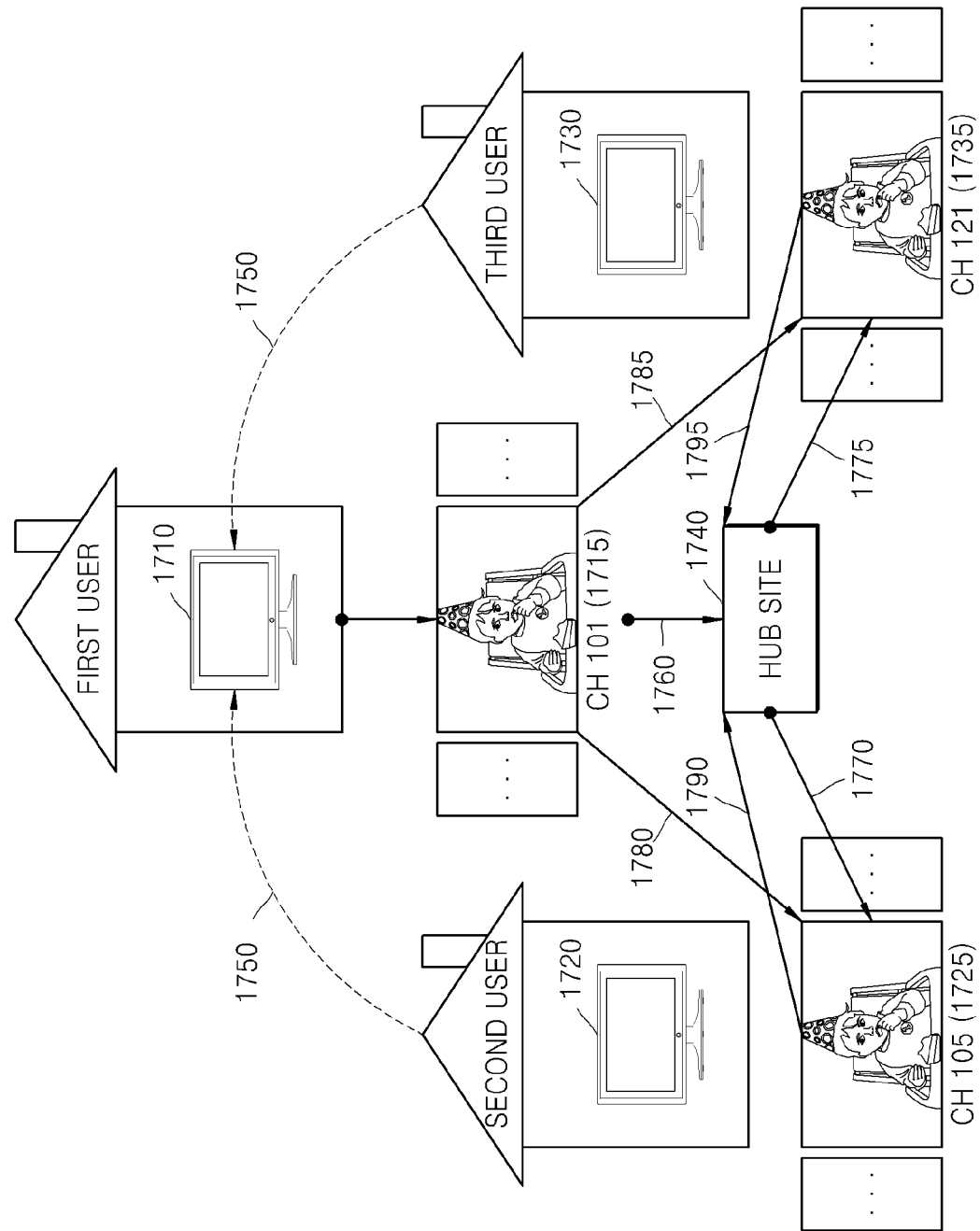
FIG. 17 is a diagram schematically illustrating a method of sharing channel setting information and information related to content reproduction via a network according to an exemplary embodiment of the present invention.

FIG. 17 is a diagram schematically illustrating a method of sharing channel setting information and information related to content reproduction via a network according to an exemplary embodiment of the present invention. A content reproducing apparatus 1710 belonging to a first user stores not only content received from an external source via an interface but also channel setting information and information related to content reproduction which are generated through integrated management of general broadcast content, as virtual channel metadata. A second user and a third user in the same network as the first user may share the virtual channel metadata of the first user and thus may reproduce the content in their own second and third content reproducing apparatuses 1720 and 1730 according to channel setting and content reproduction states in the content reproducing apparatus 1710 of the first user.

The second (or third) user may request the first user to share the virtual channel metadata (operation 1750). Next, the first user may register virtual channel metadata with a hub site 1740 in order to share the virtual channel metadata (operation 1760). The second user may access the hub site 1740 in order to receive the virtual channel metadata of the first user (operation 1770). The first user may access the third user via the hub site 1740 and provide the third user with the virtual channel metadata in order to set up network sharing with the third user (operation 1775). In an exemplary embodiment of the present invention, authentication may be performed among the first through third content reproducing apparatuses 1710, 1720, and 1730 in order to set up network sharing among the first through third users.

The first user may directly deliver the virtual channel metadata to the second user in order to set up network sharing without using the hub site 1740 (operation 1780). Alternatively, in order to set up network sharing with the third user, the first user may deliver the virtual channel metadata to the third user and access the third user in order to control a virtual channel and content reproduction of the third user (operation 1785).

The second and third users may evaluate the content by using the virtual channel metadata and record comments or requests related to the content at the hub site 1740 (operations 1790 and 1795).

Even if the second and third content reproducing apparatuses 1720 and 1730 of the second and third users generate virtual channels based on the virtual channel metadata of the first user, the same channel number does not need to be allocated to the virtual channels of the first through third users. Since an unoccupied channel is determined to be a virtual channel, the generated virtual channels are allocated the channel numbers of unoccupied channels of the second and third content reproducing apparatuses 1720 and 1730. For example, even if the virtual channel of the first user is a channel CH101 1715, the second user may determine a channel CH105 1725 to be a virtual channel and the third user may determine a channel CH121 1735 to be a virtual channel.

Accordingly, when the first user shares the virtual channel metadata with the other users in the network, the other users may also view the content according to the mapping relationship between the content and channels and the reproduction state of the content, e.g., screen configuration, an application for running the content, and a point of time at which the content is to be reproduced, which are determined by the first user.

Figure 18:
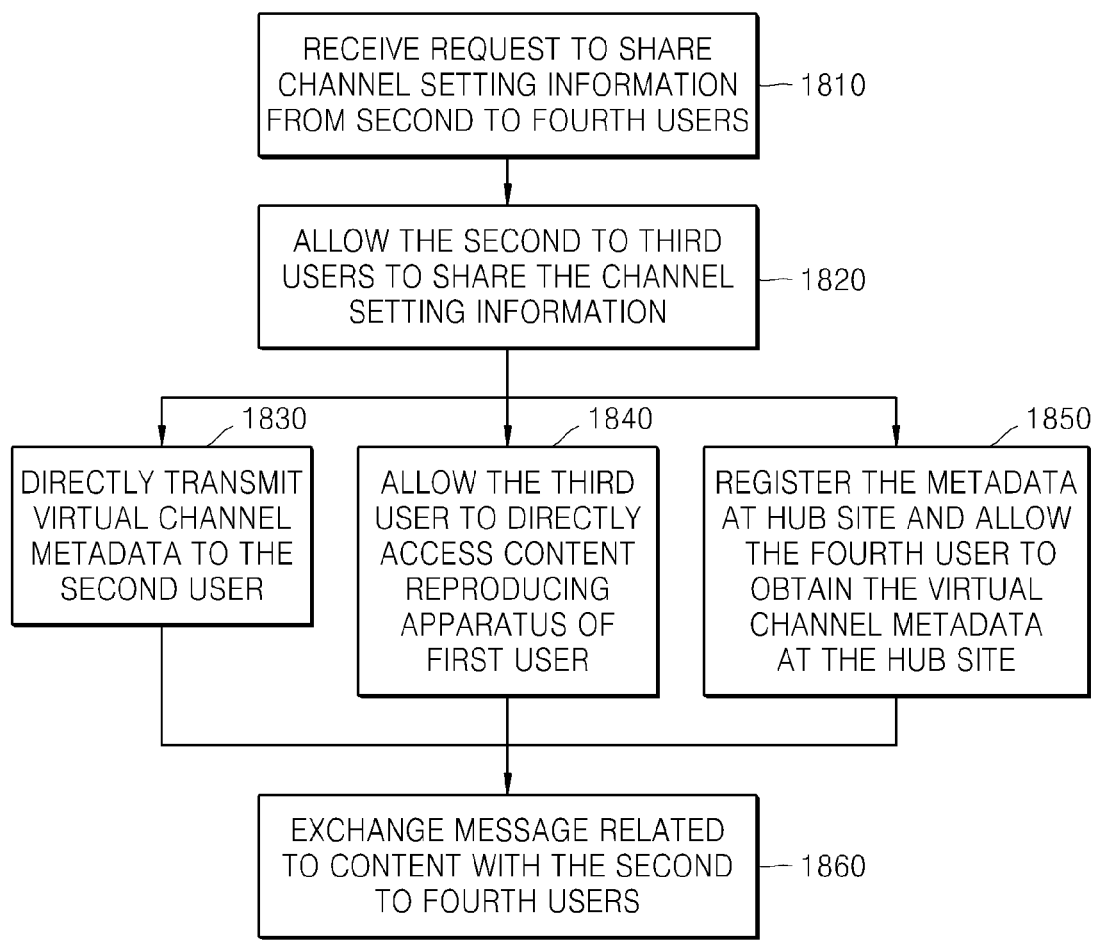
FIG. 18 is a flowchart illustrating a method of sharing channel setting information and information related to content reproduction via a network according to an exemplary embodiment of the present invention.

FIG. 18 is a flowchart illustrating a method of sharing channel setting information and information related to content reproduction via a network according to an exemplary embodiment of the present invention. A first user receives requests to share channel setting information from second through fourth users via a network (operation 1810). Next, the first user allows these users to share the channel setting information (operation 1820). The first user may set up network sharing in various ways. For example, the first user may directly transmit virtual channel metadata to the second user (operation 1830). Alternatively, the first user may allow the third user to directly access, for example, the content reproducing apparatus 100 of FIG. 1A of the first user in order to obtain the virtual channel metadata (operation 1840). If the first user registers the virtual channel metadata with the hub site, the fourth user may obtain the virtual channel metadata at the hub site (operation 1850).

The first user may exchange messages related to content with the second to fourth users (operation 1860). The second to fourth users may inform the first user that channel setting and reproduction of the content has ended. If the content, channel setting information, and information related to content reproduction are updated, the first user may inform the second to fourth users in the same network of this fact.

Figure 19:
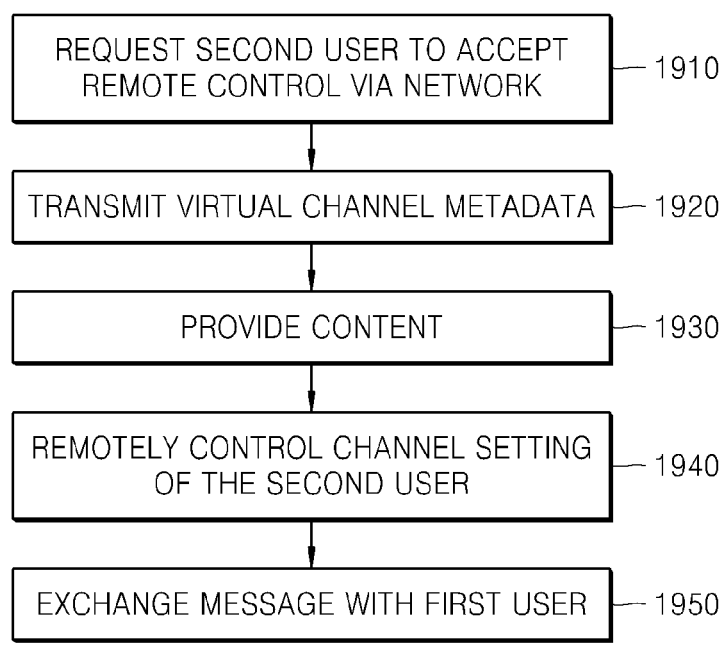
FIG. 19 is a flowchart illustrating a method of sharing channel setting information and information related to content reproduction through remote control according to an exemplary embodiment of the present invention.

FIG. 19 is a flowchart illustrating a method of sharing channel setting information and information related to content reproduction through remote control according to an exemplary embodiment of the present invention. A first user requests a second user to accept remote control via a network in order to help set channels and reproduce shared content in the content reproducing apparatus 200 of FIG. 2 of the second user, which is shared in the network (operation 1910). If the second user accepts the remote control, the content reproducing apparatus 100 of the first user transmits virtual channel metadata to the content reproducing apparatus 200 (operation 1920). Next, the first content reproducing apparatus 100 provides the content reproducing apparatus 200 with content that is to be shared (operation 1930). Alternatively, the content may be directly transmitted from the first user to the second user. Alternatively, the first user may control the content reproducing apparatus 200 to access the URI of the content and obtain the content.

The first user remotely controls the content to be allocated to a virtual channel of the content reproducing apparatus 200 and to be reproduced via the virtual channel, based on channel setting information and reproduction state information included in the virtual channel metadata (operation 1940). The second user evaluates the content and exchanges messages thereof with the first user (operation 1950).

Accordingly, it is possible to allow a user to share with another party who has difficulty accessing a network or handling electronic devices. If the other party selects a virtual channel set by the user, then the other party may evaluate content mapped to the virtual channel according to screen configuration, a reproduction method, and a point of time at which the content is to be reproduced, which are determined by the user.

Figure 20A:
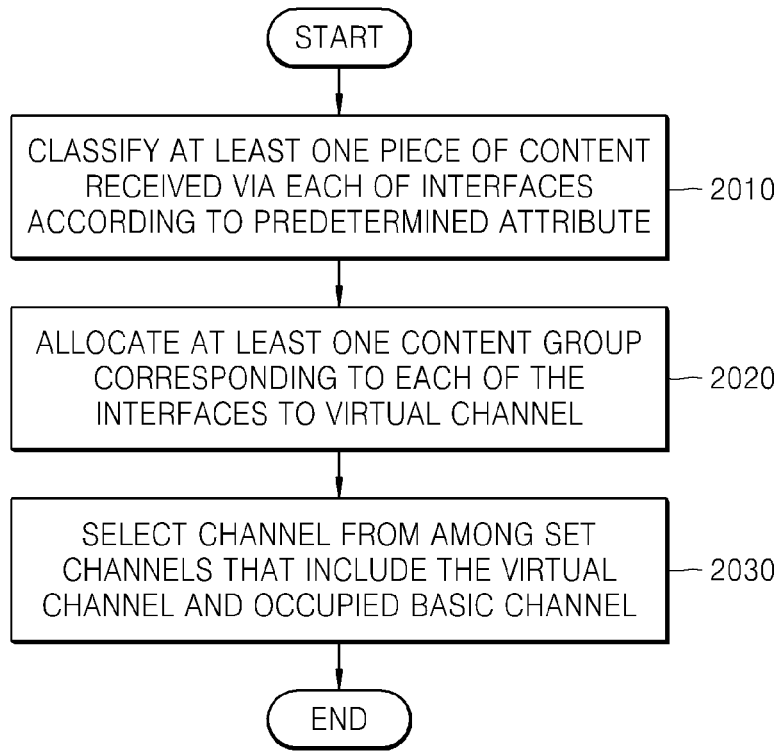
FIG. 20A is a flowchart illustrating a method of reproducing content according to an exemplary embodiment of the present invention.

FIG. 20A is a flowchart illustrating a method of reproducing content according to an exemplary embodiment of the present invention. In operation 2010, at least one piece of content received via each of interfaces is classified according to a predetermined attribute. The predetermined attribute of the received content may be analyzed and categorized into a content group having a plurality of pieces of content having the predetermined attribute. If only one piece of content has the predetermined attribute, the content group may include only this content. If a plurality of reference attributes for content classification are determined, a plurality of content groups that respectively correspond to the reference attributes may be determined.

In operation 2020, at least one content group corresponding to each of the interfaces is respectively allocated to at least one virtual channel. Unoccupied channels except for basic channels, such as broadcast channels, may be determined to be virtual channels. Channel numbers may be allocated to the virtual channels hierarchically or by using a horizontal channel allocation method, according to the attributes for classification of the at least one content group.

In operation 2030, a desired channel is selected from among set channels that include the virtual channel and an occupied basic channel. All the set channels are displayed in a channel selection guide, and thus, a user may select desired content from among broadcast content and externally input content, based on the channel selection guide and according to the same user manipulation method. The user may perform channel management, e.g., setting or changing virtual channels, by using the channel selection guide.

In an exemplary embodiment of the present invention, at least one piece of content allocated to a selected, predetermined channel may be reproduced. The content may be reproduced based on reproduction state information thereof. When channel switching occurs, the content may be reproduced either from a point at which reproduction of the content was discontinued or when a period of time during which the reproduction was discontinued elapsed from the point at which the reproduction was discontinued. If a plurality of pieces of content belong to a content group mapped to the selected channel, the pieces of content may be seamlessly reproduced or may be displayed in the form of a thumbnail image.

In an exemplary embodiment of the present invention, channel setting information may be stored. The channel setting information may specify a reference attribute for content classification, content groups, the mapping relationship between the content groups and virtual channels, and a hierarchical structure of channel numbers allocated to the virtual channels.

In an exemplary embodiment of the present invention, the reproduction state information may be stored. The reproduction state information may specify a starting point of time at which content reproduction starts, a point of time at which the content reproduction is discontinued, screen configuration, an application for running the content, and so on.

Figure 20B:
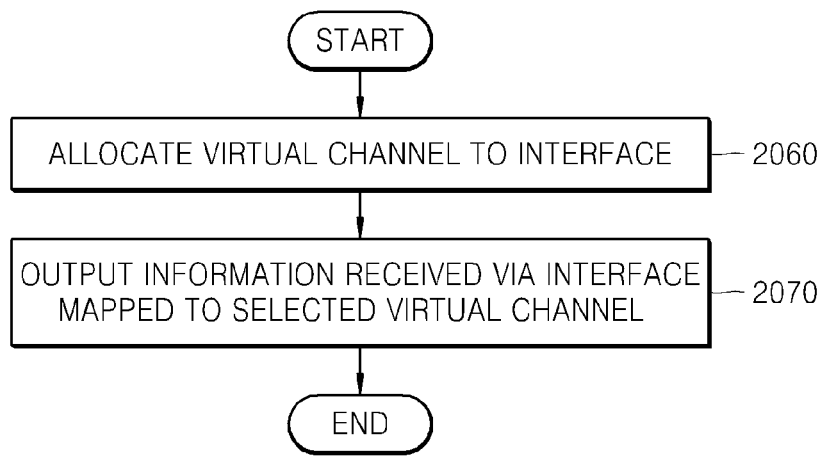
FIG. 20B is a flowchart illustrating a method of reproducing content according to another exemplary embodiment of the present invention.

FIG. 20B is a flowchart illustrating a method of reproducing content according to another exemplary embodiment of the present invention. In operation 2060, at least one virtual channel is respectively allocated to at least one interface. If at least one piece of file information is received via the at least one interface, the file information is classified into at least one file group according to at least one attribute. In this case, one virtual channel is allocated to the file group.

An allocated virtual channel may be a sub channel of a virtual channel allocated to the interface. After the virtual channel is allocated to the file group, a sub channel of the allocated virtual channel may be allocated to any additional file group.

In operation 2070, when the virtual channel is selected, information received via an interface mapped to the selected virtual channel is output. When the information via the interface is streaming information, the streaming information may be output. When the information via the interface is at least one piece of file information, the file information may be output.

Figure 21:
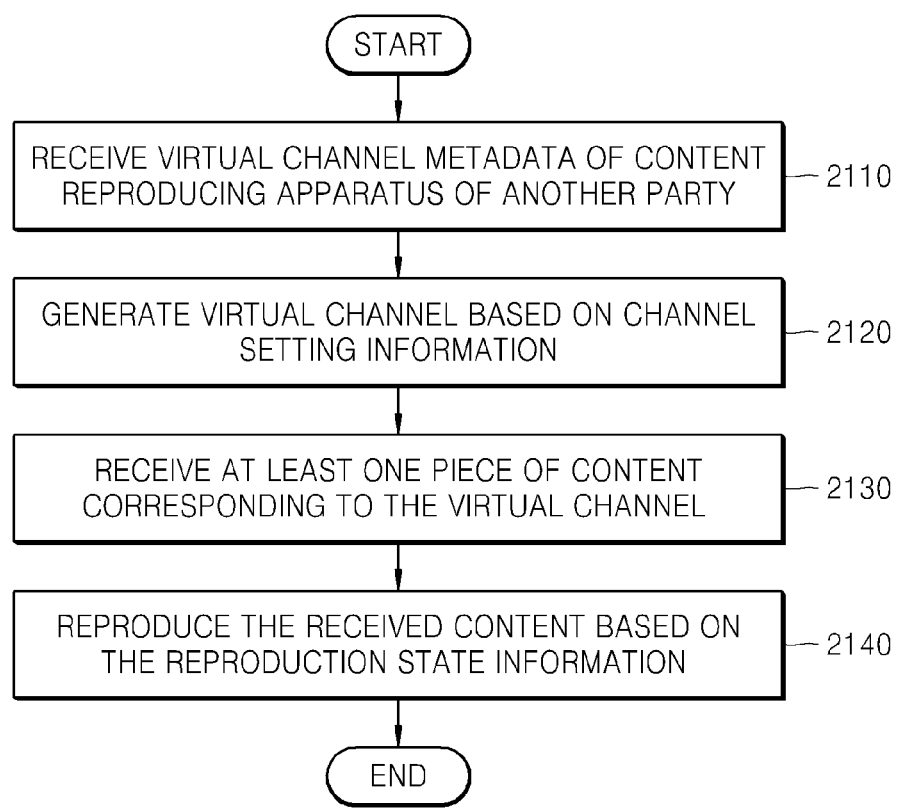
FIG. 21 is a flowchart illustrating a method of reproducing content shared via a network according to an exemplary embodiment of the present invention.

FIG. 21 is a flowchart illustrating a method of reproducing content shared via a network according to an exemplary embodiment of the present invention. In operation 2110, virtual channel metadata that includes channel setting information and reproduction state information of content of a content reproducing apparatus belonging to another party is received. A user may request the other party to set up network sharing. The virtual channel metadata may be directly received from the other party or may be received by accessing the content reproducing apparatus of the other party. If network sharing is set up via a hub site, the other party may register the virtual channel metadata with the hub site, and thus, the virtual channel metadata may be obtained at the hub site.

In operation 2120, at least one virtual channel is generated based on the channel setting information. The generated virtual channel of the user may be mapped to the same content group mapped to a virtual channel of the other party, based on a mapping relationship between the content group and channels, which is specified in the channel setting information of the other party. A channel number allocated to the virtual channel of the user may be different from that allocated to the virtual channel of the other party.

In operation 2130, a least one piece of content corresponding to the generated virtual channel is received. Shared content may be directly received from the other party. Alternatively, the content may be obtained by extracting a URI of the content from the virtual channel metadata and accessing the URI. Alternatively, when the other party registers the content with a hub site, the user may obtain the content at the hub site.

In operation 2140, the received content is reproduced based on the reproduction state information. The user may reproduce the content mapped to a channel set by, for example, the content reproducing apparatus 100 of the other party in the same manner that the content was reproduced in the content reproducing apparatus 100, i.e., according to screen configuration, an application for running the content, and a point of time at which the content was reproduced.

The above exemplary embodiments of the present invention may be embodied as a computer program. The computer program may be stored in a computer readable recording medium, and executed using a general digital computer. Examples of the computer readable medium include a magnetic recording medium (a ROM, a floppy disc, a hard disc, etc.), and an optical recording medium (a CD-ROM, a DVD, etc.).

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of reproducing at least one piece of content received via at least one interface among a plurality of interfaces, the method comprising:
classifying, by a multimedia reproducing device, a plurality of pieces of content received via at least one external input interface according to the at least one external input interface;
classifying, by the multimedia reproducing device, pieces of content, among the plurality pieces of content, received via each of the at least one external input interface according to a plurality of reference attributes;
allocating, by the multimedia reproducing device, the plurality of pieces of content classified according to the at least one external input interface to at least one first virtual channel with an upper channel number selected from among unoccupied channels;
allocating, by the multimedia reproducing device, the pieces of content classified according to the plurality of reference attributes to at least one second virtual channel with a lower channel number corresponding to the upper channel number selected from among the unoccupied channels;
generating, by the multimedia reproducing device, a channel selection programming guide displaying set channels which include the at least one first virtual channel, the at least one second virtual channel and occupied basic channel;
reproducing by the multimedia reproducing device, the channel selection programming guide; and
selecting by the multimedia reproducing device, a channel from among the set channels that include the at least one first virtual channel, the at least one second virtual channel and the occupied basic channel based on the channel selection programming guide,
wherein the plurality of interfaces include an internal input interface for receiving a broadcast signal and the at least one external input interface for receiving an external signal,
wherein at least one of the classifying, the allocating and the selecting is performed using a processor,
wherein the classifying of the plurality of pieces of content comprises classifying the plurality of pieces of content into a plurality of content groups having a hierarchical structure, based on a hierarchical structure of a plurality of attributes.

2. The method of claim 1, further comprising:
storing channel setting information; and
storing reproduction state information of the at least one piece of content.

3. The method of claim 2, further comprising reproducing the at least one piece of content based on reproduction state information of the at least one piece of content.

4. The method of claim 3, wherein the at least one piece of content is reproduced again, based on a point of time at which reproduction of the content has been discontinued, where the point of time is specified in the reproduction state information.

5. The method of claim 3, wherein the reproducing of the at least one piece of content comprises reproducing the at least one piece of content again when the difference between a time when reproduction of the at least one piece of content has been discontinued and a current time elapses from a point of time at which reproduction of the at least one piece of content has been discontinued, based on the point of time at which reproduction of the content has been discontinued, wherein the point of time is specified in the reproduction state information.

6. The method of claim 2, further comprising transmitting virtual channel metadata via a network, wherein the virtual channel metadata comprises information regarding the classification of the at least one piece of content, the channel setting information, and the reproduction state information.

7. The method of claim 6, wherein the transmitting of the virtual channel metadata comprises registering the at least one piece of content and the virtual channel metadata with a hub site in the network,
wherein another party obtains the virtual channel metadata and the at least one piece of content at the hub site.

8. The method of claim 6, wherein the transmitting of the virtual channel metadata further comprises transmitting content of the at least one piece of content corresponding to the virtual channel metadata, in response to a request from another party receiving the virtual channel metadata, wherein the another party sets channels of a multimedia reproducing apparatus of the another party based on the channel setting information included in the virtual channel metadata, and when the another party selects a requested virtual channel based on a list of the set channels, content of the at least one piece of content corresponding to the selected requested virtual channel is reproduced based on the reproduction state information included in the virtual channel metadata.

9. The method of claim 6, wherein the transmitting of the virtual channel metadata further comprises:

accessing a multimedia reproducing apparatus of another party receiving the virtual channel metadata;

remotely controlling the multimedia reproducing apparatus of the another party to set a list of channels of the multimedia reproducing apparatus of the another party, based on the channel setting information of the virtual channel metadata; and providing content of the at least one piece of content corresponding to the at least one second virtual channel, and wherein, when the other party selects a requested virtual channel based on the list of the channels which are set under remote control, content of the at least one piece of content corresponding to the selected requested virtual channel is reproduced based on the reproduction state information included in the virtual channel metadata.

10. The method of claim 2, wherein the reproduction state information specifies a point of time at which reproduction of the at least one piece of content has been discontinued, a screen configuration used when the at least one piece of content is reproduced, and an application for running the at least one piece of content.

11. The method of claim 2, wherein the storing of the channel setting information comprises updating the channel setting information when channel setting is changed.

12. The method of claim 2, wherein the storing of the reproduction state information comprises updating the reproduction state information when a reproduction state of the content is changed.

13. The method of claim 1, wherein the classifying of the at least one piece of content comprises classifying the at least one piece of content, which is respectively received via the at least one interface, into at least one content group according to at least one attribute, wherein each content group of the at least one content group comprises at least one piece of content having a same attribute from among the at least one attribute, and the allocating of the classified at least one piece of content to the at least one first virtual channel comprises allocating one virtual channel selected from among the unoccupied channels to each content group.

14. The method of claim 13, wherein the allocating of the classified content to the at least one first virtual channel comprises hierarchically allocating channel numbers to respective content groups of the plurality of content groups.

15. The method of claim 13, wherein the at least one attribute comprises the reference attribute.

16. The method of claim 1, wherein the classifying of the at least one piece of content comprises:

interpreting an attribute of the received at least one content; and determining the reference attribute for classification of the at least one piece of content, and classifying the at least one piece of content by comparing the interpreted attribute with the reference attribute.

17. The method of claim 16, wherein the reference attribute comprises at least one of:

a time when the at least one piece of content has been generated;

an application for running the at least one piece of content;

a media type of the at least one piece of content;

a coding method of the at least one piece of content;

a file name of the at least one piece of content;

a file extension of the at least one piece of content;

an event related to the at least one piece of content; and a theme of the at least one piece of content.

18. The method of claim 1, wherein the at least one first virtual channel and the at least one second virtual channel are allocated channel numbers from among all channel numbers excluding a channel number allocated to the occupied basic channel.

19. The method of claim 1, wherein the at least one piece of content comprises on-line content accessed via a network interface, and the reference attribute comprises a uniform resource identifier (URI) of the on-line content.

20. The method of claim 1, wherein the at least one interface comprises at least one of:

an interface according to universal serial bus (USB) standards;

an interface for receiving a composite audio/video (AV) signal;

an interface for a separated-video signal;

a serial bus interface according to IEEE 1394 standards;

an interface for wired network connection; and an interface for wireless network connection.

21. The method of claim 1, further comprising transforming the analog signal into digital data, when an analog signal is received via the at least one interface.

22. The method of claim 1, further comprising changing the at least one second virtual channel.

23. The method of claim 22, wherein the changing of the at least one second virtual channel comprises changing the at least one second virtual channel allocated the at least one piece of content, based on a number of times that a user selects the at least one piece of content to be reproduced.

24. The method of claim 22, wherein the changing of the at least one second virtual channel comprises changing at least one of the hierarchical structure of the lower channel number allocated to the at least one second virtual channel, the reference attribute, the channel number of the at least one second virtual channel, and a name of the at least one second virtual channel.

25. The method of claim 1, wherein the reproducing of the channel selection programming guide comprises displaying a plurality of pieces of content corresponding to the set channels and information regarding reproduction states of the plurality of pieces of content, as a menu for channel selection.

26. The method of claim 25, wherein the reproducing of the channel selection programming guide further comprises displaying at least one of a menu for deleting a channel, a menu for combining channels together, a menu for dividing a channel, and a menu for adding a new virtual channel from among the at least one first virtual channel, the at least one second virtual channel and the occupied basic channel, as a menu for channel management.

27. The method of claim 25, wherein the reproducing of the channel selection programming guide further comprises displaying at least one of a menu for delivering the virtual channel metadata, which includes the channel setting information and the reproduction state information, to an external location, a menu for transmitting the at least one piece of content, a menu for accessing a hub site, a menu for calling another party, a menu for allowing the other party access, a menu for chatting, and a menu for remote control, as a menu for network communication.

28. The method of claim 25, wherein the reproducing of the channel selection programming guide further comprises displaying at least one of a menu for editing the content and a menu for capturing the content, as a menu for management of content reproduction.

29. The method of claim 28, further comprising reproducing content of the at least one piece of content allocated to the selected channel.

30. The method of claim 29, wherein, when a plurality of pieces of content correspond to the at least one second virtual channel as the selected channel, the reproducing of content of the at least one piece of content allocated to the selected channel comprises seamlessly reproducing the at least one piece of content or displaying the at least one piece of content in a form of a thumbnail image.

31. The method of claim 1, wherein the at least one piece of content being respectively received via the at least one interface is received in a form of a data stream.

32. The method of claim 1, wherein each piece of the at least one piece of content belongs to a same attribute.

33. The method of claim 1, wherein the classifying of the at least one piece of content and the selecting the channel are performed according to each respective interface of the at least one interface.

34. A non-transitory computer readable recording medium having recorded thereon a computer program for executing the method of claim 1.

35. The method of claim 1, wherein the at least one first virtual channel with the upper number is allocated based on an interface type of the at least one external input interface.

36. The method of claim 1, wherein the at least one first virtual channel with the upper number is allocated independent of the broadcast signal.

37. A method of reproducing content shared with another party accessed via a network, the method comprising:
receiving, by a multimedia reproducing device, virtual channel metadata of a multimedia reproducing apparatus of the another party, wherein the virtual channel metadata comprises channel setting information and reproduction state information of the content;
generating, by the multimedia reproducing device, at least one first virtual channel with an upper channel number selected from among unoccupied channels and at least one second virtual channel with a lower channel number corresponding to the upper channel number selected from among the unoccupied channels based on the channel setting information;
receiving, by the multimedia reproducing device, at least one piece of content corresponding to the at least one second virtual channel; and
reproducing, by the multimedia reproducing device, the at least one piece of content based on the reproduction state information,
wherein the at least one first virtual channel is allocated to a content group into which the at least one piece of content received via at least one interface of the multimedia reproducing apparatus of the another party is classified according to at least one reference attribute, the content group having a hierarchical structure based on a hierarchical structure of a plurality of attributes,
wherein the content group comprises content of the at least one piece of content having a same attribute,
wherein the at least one second virtual channel is allocated to each of the at least one piece of content in the content group, and
wherein at least one of the receiving the virtual channel metadata, the generating, the receiving the at least one piece of content, and the reproducing is performed using a processor.

38. The method of claim 37, further comprising generating a channel selection programming guide by using the generated at least one virtual channel,
wherein the receiving of the at least one piece of content comprises:
reproducing the channel selection programming guide; and
when a channel selected based on the channel selection programming guide is one virtual channel of the at least one second virtual channel, receiving content of the at least one piece of content corresponding to the selected channel.

39. The method of claim 38, wherein the receiving of the content of the at least one piece of content corresponding to the selected channel comprises:
searching the virtual channel metadata for location information of the content of the at least one piece of content corresponding to the selected channel; and
receiving the content of the at least one piece of content based on the location information.

40. The method of claim 37, further comprising accessing the virtual channel metadata of the another party and the at least one piece of content corresponding to the at least one first virtual channel and the at least one second virtual channel, which are registered with a hub site in the network.

41. The method of claim 37, wherein the generating of the at least one virtual channel comprises generating the at least one first virtual channel and the at least one second virtual channel based on the channel setting information, under remote control of the another party,
the receiving of the at least one piece of content comprises receiving content of the at least one piece of content corresponding to a channel selected by the another party, the selected channel being one virtual channel of the at least one second virtual channel, and
the reproducing of the at least one piece of content comprises reproducing the at least one piece of content according to a reproduction state determined by the another party, based on the reproduction state information.

42. The method of claim 37, further comprising transmitting a message regarding the content to the another party via the network.

43. A non-transitory computer readable recording medium having recorded thereon a computer program for executing the method of claim 37.

44. A multimedia reproducing device for reproducing at least one piece of content received via at least one interface among a plurality of interfaces, the multimedia reproducing device comprising:
a processor;
a content classification unit that classifies a plurality of pieces of content received via at least one external input interface according to the at least one external input interface and classifies pieces of content, among the plurality of pieces of content, received via each of the at least one external input interface according to a plurality of reference attributes;

a virtual channel allocation unit that allocates the plurality of pieces of content classified according to the at least one external input interface to at least one first virtual channel with an upper channel number selected from among unoccupied channels and allocates the pieces of content classified according to the plurality of reference attributes to at least one second virtual channel with a lower channel number corresponding to the upper channel numbers selected from among the unoccupied channels;

a channel selection programming guide reproduction unit that generates a channel selection programming guide displaying the set channels which include the at least one virtual channel, the at least one second virtual channel and occupied basic channel, and reproducing the channel selection programming guide; and a channel selection unit that selects a channel from among set channels that include the at least one first virtual channel, the at least one second virtual channel and an occupied basic channel based on the channel selection programming guide, wherein at least one of the content classification unit, the virtual channel allocation unit and the channel selection unit is controlled by the processor, wherein the plurality of interfaces include an internal input interface for receiving a broadcast signal and the at least one external input interface for receiving an external signal, wherein the content classification unit classifies the plurality of pieces of content into a plurality of content groups having a hierarchical structure, based on a hierarchical structure of a plurality of attributes.

45. The multimedia reproducing device of claim 44, further comprising a memory that stores channel setting information and reproduction state information of the at least one piece of content.

46. The multimedia reproducing device of claim 45, further comprising a network sharing unit that transmits virtual channel metadata via a network, wherein the virtual channel metadata comprises information regarding the classification of the at least one piece of content, the channel setting information, and the reproduction state information.

47. The multimedia reproducing device of claim 44, wherein each piece of the at least one piece of content belongs to a same attribute.

48. The multimedia reproducing device of claim 44, wherein the classifying of the at least one piece of content and the selecting the channel are performed according to each respective interface of the at least one interface.

49. The multimedia reproducing device of claim 44, further comprising a channel selection programming guide generation unit that generates a channel selection programming guide by using the at least one first virtual channel and the at least one second virtual channel, wherein, when a channel selected based on the channel selection programming guide is one virtual channel of the at least one second virtual channel, the content receiving unit receives content of the at least one piece of content corresponding to the selected channel.

50. A multimedia reproducing device for reproducing content shared with another party accessed via a network, the multimedia reproducing device comprising:

a processor;

a virtual channel metadata receiving unit that receives virtual channel metadata of a multimedia reproducing apparatus of the another party, wherein the virtual channel metadata comprises channel setting information and reproduction state information of the content;

a virtual channel generation unit that generates at least one first virtual channel with an upper channel number selected from among unoccupied channels and at least one second virtual channel with a lower channel number corresponding to the upper channel number selected from among the unoccupied channels based on the channel setting information;

a content receiving unit that receives at least one piece of content corresponding to the at least one second virtual channel; and a content reproduction unit that reproduces the at least one piece of content based on the reproduction state information, wherein the at least one first virtual channel is allocated to a content group into which the at least one piece of content received via at least one interface of the multimedia reproducing apparatus of the another party is classified according to at least one reference attribute, the content group having a hierarchical structure based on a hierarchical structure of a plurality of attributes, wherein the content group comprises content of the at least one piece of content having a same attribute, wherein the at least one second virtual channel is allocated to each of the at least one piece of content in the content group, and wherein at least one of the virtual channel metadata receiving unit, the virtual channel generation unit, the content receiving unit, and the content reproduction unit is controlled by the processor.

51. A method of reproducing at least one piece of content received via at least one interface, the method comprising:

allocating, by a multimedia reproducing device, at least one first virtual channel with an upper channel number selected from among unoccupied channels to the at least one interface;

allocating, by a multimedia reproducing device, at least one second virtual channel with a lower channel number corresponding to the upper channel number selected from among the unoccupied channels; and when a virtual channel of the at least one first virtual channel is selected, outputting, by a multimedia reproducing device, information received via an interface mapped to the selected virtual channel of the at least one first virtual channel, wherein when the information received via the mapped interface is at least one piece of file information, further comprising classifying the file information into a file group according to at least one attribute, the file group having a hierarchical structure based on a hierarchical structure of a plurality of attributes, wherein the at least one second virtual channel is allocated to the file group, and wherein at least one of the respectively allocating and the outputting is performed using a processor.

52. The method of claim 51, wherein, when the information received via the mapped interface is streaming information, the outputting of the information comprises outputting the streaming information.

53. The method of claim 51, wherein, when the information received via the mapped interface is the at least one piece of file information, the outputting of the information comprises outputting the at least one piece of file information.

54. The method of claim 51, wherein the at least one second virtual channel allocated to the file group is a sub channel of the at least one first virtual channel allocated to the at least one interface.

55. The method of claim 51, wherein the allocating of the at least one first virtual channel to the at least one interface comprises determining a new file group, which is additionally generated after the at least one second virtual channel is allocated to the file group, to be a sub channel of the at least one first virtual channel.

56. A non-transitory computer readable recording medium having recorded thereon a computer program for executing the method of claim 51.

57. A multimedia reproducing device for reproducing at least one piece of content received via at least one interface, the multimedia reproducing device comprising:

a processor;

an interface-based virtual channel allocation unit that respectively allocates at least one first virtual channel with an upper channel number selected from among unoccupied channels to the at least one interface, and allocates at least one second virtual channel with a lower channel number corresponding to the upper channel number selected from among the unoccupied channels; and an interface-based information output unit that outputs information received via an interface mapped to a selected virtual channel of the at least one first virtual channel when the selected virtual channel is selected, wherein when the information received via the mapped interface is at least one piece of file information, further comprising classifying the file information into a file group according to at least one attribute, the file group having a hierarchical structure based on a hierarchical structure of a plurality of attributes, wherein the at least one second virtual channel is allocated to the file group, and wherein at least one of the interface-based virtual channel allocation unit and the interface-based information output unit is controlled by the processor.

* * * * *